US010956691B2

United States Patent
Kato

(10) Patent No.: US 10,956,691 B2
(45) Date of Patent: Mar. 23, 2021

(54) RFID TAG READING METHOD, RFID TAG READING SYSTEM, RFID TAG READER DEVICE, AND ARTICLE

(71) Applicant: Murata Manufacturing Co., Ltd., Nagaokakyo (JP)

(72) Inventor: Noboru Kato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/599,551

(22) Filed: Oct. 11, 2019

(65) Prior Publication Data
US 2020/0042755 A1   Feb. 6, 2020

Related U.S. Application Data

(63) Continuation of application No. PCT/JP2018/041503, filed on Nov. 8, 2018.

(30) Foreign Application Priority Data

Nov. 9, 2017   (JP) .............................. JP2017-216696

(51) Int. Cl.
*G06K 7/08* (2006.01)
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC .... G06K 19/0723; G06K 19/077; G06K 7/10; G06K 7/10336; G06K 7/10366;
(Continued)

(56) References Cited

U.S. PATENT DOCUMENTS

2005/0173532 A1* 8/2005 Hasebe ............ G06K 19/07779
235/451
2010/0067210 A1* 3/2010 Sato ....................... B65D 81/00
361/818
(Continued)

FOREIGN PATENT DOCUMENTS

JP      2005138115 A      6/2005
JP      2005141388 A      6/2005
(Continued)

OTHER PUBLICATIONS

International Search Report issued for PCT/JP2018/041503, dated Dec. 25, 2018.
(Continued)

*Primary Examiner* — Thien M Le
(74) *Attorney, Agent, or Firm* — Arent Fox LLP

(57) ABSTRACT

An RFID tag reading method, RFID tag reading system, RFID tag reading device, and an article, are provided for preventing fraud on the RFID tag. An exemplary method for reading an RFID tag with a loop antenna housed within a case of an article, includes inserting a tip of a linear antenna into the case through a hole formed in the case by using a reader device with the linear antenna having the tip as an open end, magnetically coupling the linear antenna inserted into the case and the loop antenna of the RFID tag, and reading tag information stored in the RFID tag by the reader device.

20 Claims, 19 Drawing Sheets

(58) Field of Classification Search
CPC ........ G06K 7/10386; H01Q 1/24; H01Q 7/00; H04B 5/02
See application file for complete search history.

(56) References Cited

U.S. PATENT DOCUMENTS

| | | | | |
|---|---|---|---|---|
| 2010/0314454 | A1* | 12/2010 | Youn | G06K 19/0723 235/492 |
| 2012/0025988 | A1* | 2/2012 | Harada | B01L 3/5453 340/572.1 |
| 2012/0206239 | A1 | 8/2012 | Ikemoto | |
| 2014/0016901 | A1* | 1/2014 | Lambourn | G02B 6/3897 385/75 |
| 2018/0197060 | A1* | 7/2018 | Yamaoka | G06K 19/073 |

FOREIGN PATENT DOCUMENTS

| | | | |
|---|---|---|---|
| JP | 2006301071 | A | 11/2006 |
| JP | 2009303129 | A | 12/2009 |
| JP | 2010218537 | A | 9/2010 |
| JP | 2011087652 | A | 5/2011 |
| JP | 2012108843 | A | 6/2012 |
| JP | 5370581 | B2 | 12/2013 |
| JP | 2013246566 | A | 12/2013 |
| WO | 2017150650 | A1 | 9/2017 |

OTHER PUBLICATIONS

Written Opinion of the International Searching Authority issued for PCT/JP2018/041503, dated Dec. 25, 2018.

* cited by examiner

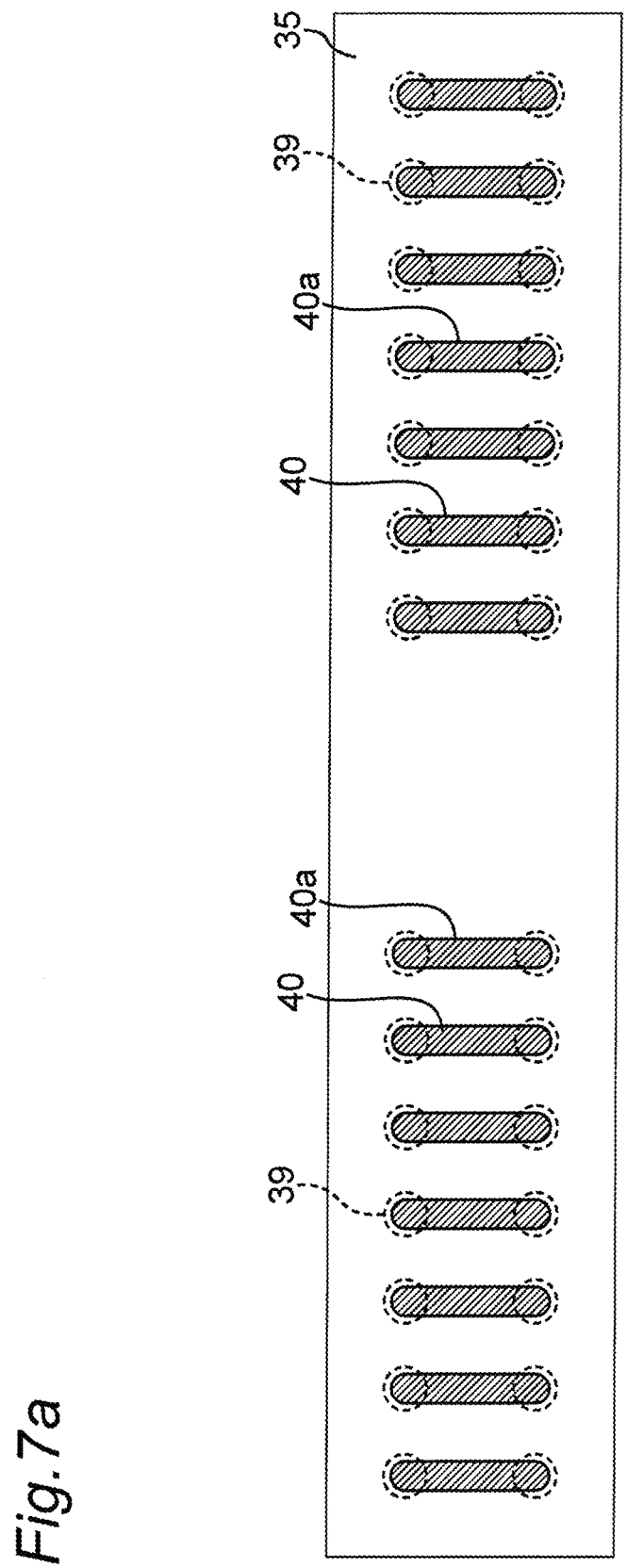

RFID TAG READING METHOD, RFID TAG READING SYSTEM, RFID TAG READER DEVICE, AND ARTICLE

CROSS REFERENCE TO RELATED APPLICATIONS

The present application is a continuation of PCT/JP2018/041503 filed Nov. 8, 2018, which claims priority to Japanese Patent Application No. 2017-216696, filed Nov. 9, 2017, the entire contents of each of which are incorporated herein by reference.

TECHNICAL FIELD

The present invention relates to a reading method, a reading system, and a reader device of a radio frequency identification (RFID) tag as a wireless communication tag for use in article information management and the like in a non-contact manner utilizing short-range wireless communications.

BACKGROUND

Currently, in an article information management system, information on articles is managed by communications utilizing electromagnetic fields in a non-contact manner between RFID tags attached to the articles and a reader device reading tag information of the RFID tags. The RFID tag is attached to the article, so light weighting and downsizing are required. The reader device is also required to accurately read the tag information of the light-weighted and downsized RFID tag.

Patent Document 1 (identified below) describes a reader device having a small-sized loop antenna at its tip to read tag information of the downsized RFID tag. The reader device can accurately read the tag information of the RFID tag stuck on a printed board by bringing the antenna of the reader device close to the RFID tag.

Patent Document 1: Japanese Patent No. 5370581.

If that tag information includes authenticity information of an article or manufacturing history information on traceability, however, it is preferred that the authenticity information or the manufacturing history information stored in an RFID tag not be illegally rewritten. Therefore, security of the RFID tag needs to be improved.

As is described in Patent Document 1, in a case that the RFID tag is attached to the external surface of the article, the tag information of the RFID tag becomes easily illegally renewable due to its easy visibility of the location at which the RFID tag is disposed. In a case that the RFID tag is disposed inside the article, the article needs to be provided with an opening of a size enough to allow insertion of an antenna with a looped tip. Provision of the opening of such a size in the article permits easy access to the RFID tag, resulting in lowered security.

SUMMARY OF THE INVENTION

Accordingly, it is therefore an object of the exemplary embodiments of the present invention to solve the above problem by providing an RFID tag reading method, reading system, and reader device, and an article, which are effective for preventing illegal activities on the RFID tag.

Thus, according to an exemplary aspect, a method for reading an RFID tag with a loop antenna housed within a case of an article is provided with the method including inserting a tip of a linear antenna into the case through a hole formed in the case by using a reader device with the linear antenna having the tip as an open end; magnetically coupling the linear antenna inserted into the case and the loop antenna of the RFID tag; and reading tag information stored in the RFID tag by the reader device.

According to another exemplary aspect, a system is provided for reading an RFID tag with the system including an article with the RFID tag attached thereto and a reader device of the RFID tag. Moreover, the article includes a case with a hole passing through from an exterior to an interior, wherein the reader device includes a linear antenna configured to be inserted into the hole and having a tip as an open end on one end side. The RFID tag is housed within the case and has a loop antenna, and the RFID tag is disposed such that a passing-through direction of the hole and a direction of a loop axis of the loop antenna intersect.

According to another exemplary aspect, a reader device of an RFID tag includes a linear antenna having a tip as an open end on one end side and that is configured to be inserted into a hole; and a feed loop electromagnetically coupled with a base on the other end side of the linear antenna.

According to another exemplary aspect, an article is provided that includes a case with a hole passing through from an exterior to an interior; and an RFID tag housed within the case and having a loop antenna, the RFID tag being disposed such that a passing-through direction of the hole and a direction of a loop axis intersect.

The RFID tag reading method, reading system, and reader device, and the article according to the exemplary aspects of the present invention are configured to prevent illegal activities on the RFID information.

BRIEF DESCRIPTION OF DRAWINGS

FIG. 7a is a diagram showing a conductor pattern of the RFID tag.

DETAILED DESCRIPTION

Figure 1:
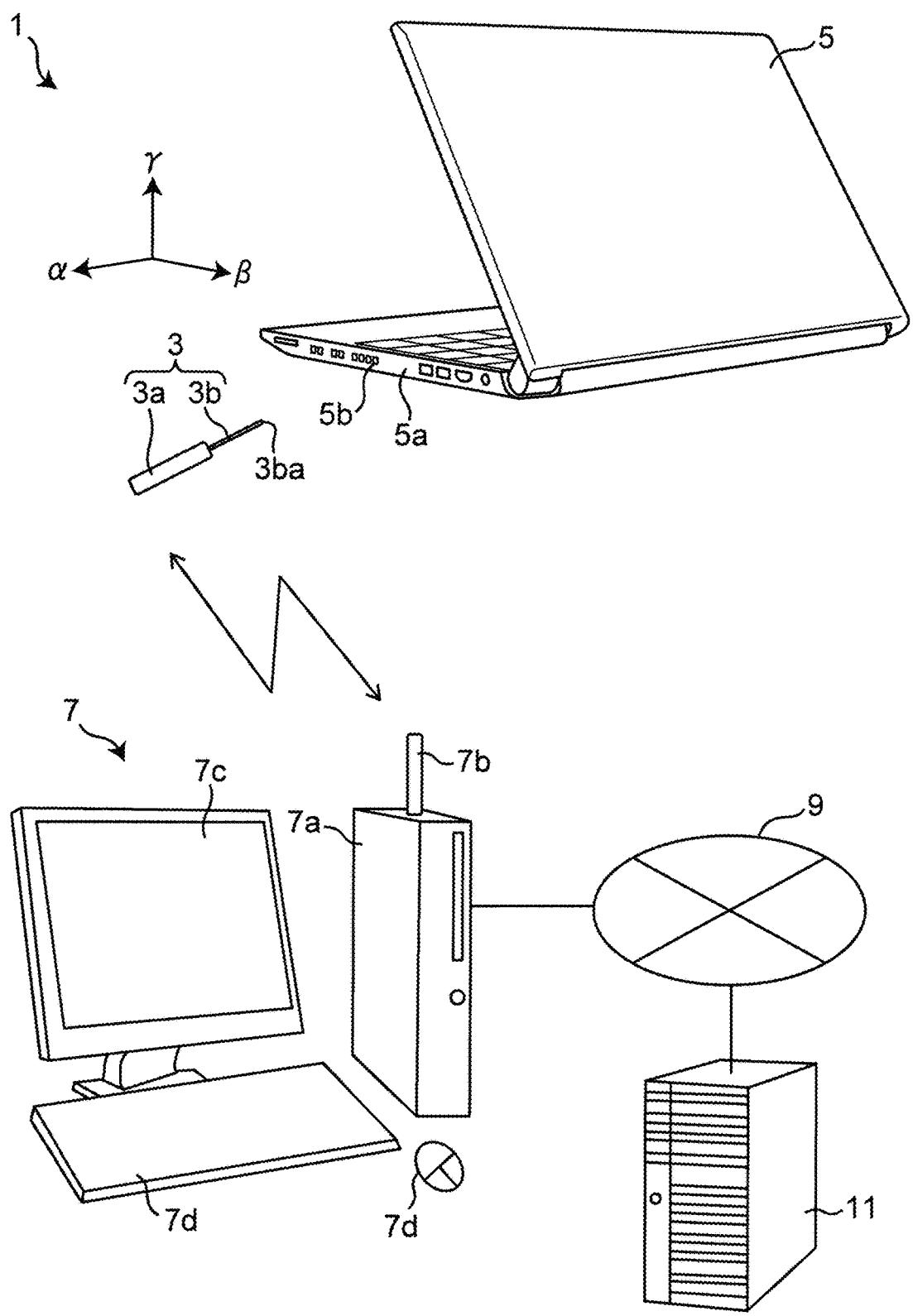
FIG. 1 is a schematic configuration diagram illustrating an RFID reading system of a first exemplary embodiment.

A method for reading an RFID tag of an exemplary aspect includes inserting a tip of a linear antenna into a case of an article through a hole formed in the case by using a reader device with the linear antenna having the tip as an open end. The method further includes magnetically coupling the linear antenna inserted into the case and the loop antenna of the RFID tag, and reading tag information stored in the RFID tag by the reader device.

The exemplary method enables an insertion into a small hole formed in the case of the article by using the linear antenna having the tip as a non-looped open end. As a result, damage to the design ability of the article is reduced. Since the RFID tag is housed in the interior of the case of the article, the RFID tag is not easily visible in appearance and illegal activities on the RFID tag are effectively prevented.

The reader device can include a feed loop electromagnetically coupled with the linear antenna at a base on the other end side opposite to the tip of the linear antenna. Moreover, the reading of tag information can be performed such that the tag information received can be read via the linear antenna and the feed loop.

Moreover, a system is provided for reading an RFID tag that includes an article with the RFID tag attached thereto and a reader device of the RFID tag. Moreover, the article includes a case with a hole passing through from an exterior to an interior, and the reader device includes a linear antenna configured to be inserted into the hole and having a tip as an open end on one end side. In addition, the RFID tag is housed within the case and has a loop antenna, and the RFID tag is disposed such that a passing-through direction of the hole and a direction of a loop axis of the loop antenna intersect.

According to this exemplary aspect, use of the reader device with the linear antenna having the tip in the form of an open end enables the tag information of the RFID tag to be read by inserting the linear antenna into the hole disposed in the case of the article. The linear antenna with the tip as an open end can have a tip shape thinner than that of the looped antenna, so that the RFID tag can be positioned, for example, behind a small hole originally formed in the case. Therefore, the location of the RFID tag can have a low visibility and illegal activities on the RFID tag information are effectively prevented.

The RFID tag can be disposed so as to enable magnetic coupling with the linear antenna inserted into the hole.

A reader device of an exemplary aspect can be a reader device of an RFID tag that includes a linear antenna having a tip as an open end on one end side and that is configured to be inserted into a hole, and a feed loop electromagnetically coupled with a base on the other end side of the linear antenna.

According to this exemplary aspect, use of the reader device with the linear antenna having the tip in the form of an open end enables the tag information of the RFID tag to be read by inserting the linear antenna into the hole disposed in the case. Since the tip shape can be thinner than that of the looped end antenna, the RFID tag can be positioned, for example, behind a small hole for ventilating originally formed in the case. Therefore, a location of the RFID tag can have a low visibility and illegal activities on RFID tag information are effectively prevented.

In an exemplary aspect, a loop axis direction of the feed loop and a base of the linear antenna can intersect. Therefore, transmission efficiency between the feed loop and the linear antenna can be improved.

Moreover, a length of the linear antenna can be shorter than a half wavelength of a communication frequency with the RFID tag. Therefore, the occurrence of a node on the linear antenna can be prevented and communication performances between the RFID tag and the linear antenna can be improved.

In addition, a length of the linear antenna can be larger than a half wavelength of a communication frequency with the RFID tag, and the tip of the linear antenna can be bent back. Therefore, even if a node occurs on the linear antenna, the RFID tag can be magnetic field coupled at the bent-back portion.

The reader device can include a coaxial cable having an inner conductor, an insulator surrounding the inner conductor, and an outer conductor surrounding the insulator. Moreover, a part of the linear antenna can be the inner conductor of the coaxial cable, with the insulator being exposed and surrounding the inner conductor on the tip side of the linear antenna. In addition, the reader device can have a matching circuit between the inner conductor and the base of the linear antenna. By using the coaxial cable as a part of the linear antenna, unnecessary magnetic field radiated from the linear antenna can be reduced.

The feed loop and the linear antenna can be arranged spaced apart from each other and are magnetic field coupled with each other.

Moreover, the feed loop and the linear antenna can be arranged in contact with each other and electrically coupled with each other.

An article of an exemplary aspect of the present invention includes a case with a hole passing through from an exterior to an interior, and an RFID tag housed within the case and having a loop antenna. In this aspect, the RFID tag is disposed such that a passing-through direction of the hole and a direction of a loop axis intersect.

According to this exemplary aspect, the RFID tag can be disposed within the case, so that the location of disproportion of the RFID tag can have a low visibility. As a result, illegal activities on the RFID tag information are effectively prevented.

Moreover, the RFID tag can be disposed within a distance shorter than a half wavelength of a communication frequency of the RFID tag from the hole in the passing-through direction of the hole.

The RFID tag can also be disposed in a projected area on which an open area of the hole is projected in the passing-through direction or disposed in the vicinity of the projected area in a direction orthogonal to the passing-through direction of the hole.

The case may be made of metal. Even if the case is made of metal, the RFID tag and the antenna wire can be magnetic field coupled.

The hole can be opened for ventilating an interior of the case or connecting to other parts within the case. Therefore, there is no need to open the hole for reading the RFID tag, so that damage to design ability of the article is prevented.

The reader device can be configured as a handy type reader device.

Tag information stored in the RFID tag can include proper ID information related to at least one of manufacturing information and authenticity information of the article.

Exemplary embodiments of a system for reading an RFID tag according to the present invention will now be described with reference to the drawings. In the drawings, members with substantially the same function and configuration are designated by the same reference numeral and may not again be described in the specification. The drawings schematically and mainly illustrate constituent elements for easy understanding.

It is noted that the exemplary embodiments hereinafter described represent specific examples of the present invention, and the present invention is not limited to this makeup. Numerical values, shapes, configurations, steps, the order of steps, etc. specifically shown in the exemplary embodiments below merely represent an example and do not intend to limit the present invention. Of the embodiments below, constituent elements not described in independent claims representing top-level concepts will be described as optional constituent elements. The same applies to configurations of variations in all embodiments and configurations described in the variations may be combined.

First Exemplary Embodiment

A description will hereinafter be given of a system and a method for reading an RFID tag according to a first embodiment of the present invention. FIG. 1 is a schematic configuration diagram of the RFID tag reading system of the first embodiment.

An RFID tag reading system 1 includes a reader device 3 configured to read tag information of the RFID tag, an article 5 having the RFID tag housed therein, and a host computer 7 with which a user checks tag information read by the reader device 3.

The reader device 3 is configured as a handy type reader device so that the user can move with the reader device 3. The reader device 3 includes an enclosure 3a with which the user grasps the reader device 3 and a rod 3b extending rectilinearly from the enclosure 3a. A tip of the rod 3b is in the shape of a stick or a needle, for example. In an exemplary aspect, a diameter of the tip of the rod 3b is equal to or more than 0.3 mm and equal to or less than 5 mm, for example. Moreover, the enclosure 3a is made of metal or resin. After reading tag information of the RFID tag disposed inside the article 5 from the rod 3b, the reader device 3 sends the read tag information to the host computer 7.

The article 5 has on its outside a case 5a covering at least a part of the interior of the article 5. In the first embodiment, a laptop computer is described as an example of the article 5. The case 5a has a hole 5b extending therethrough from the exterior to the interior. The hole 5b is provided for a specific use of another part of the article 5. For example, the hole 5b is made for ventilating the interior of the case 5a or for connecting to other internal parts of the case 5a. The dimension of the diameter of the hole 5b is, for example, equal to or more than 1 mm and equal to or less than 50 mm. If the article 5 is the laptop computer in this exemplary embodiment, the hole 5b is a vent hole or an earphone jack. The case 5a has an RFID tag 21 housed therein, so the RFID tag 21 (see, e.g., FIG. 2) is less visible from the exterior of the case 5a. In the first embodiment, at least a part of the case 5a is made of metal but the case 5a may be entirely made of resin. In FIG. 1, the longitudinal direction of the article 5 is an α direction, the width direction thereof is a β direction, and the height direction thereof is a γ direction. The α, β, and γ directions are orthogonal to one another.

The host computer 7 includes a processor 7a configured to process tag information received, an antenna 7b communicating by a wireless LAN with the reader device 3, a display 7c displaying the processed tag information, and an input part 7d configured to input various instructions to the processor 7a. The host computer 7 displays tag information received from the reader device 3 on the display 7c, so the user can check information on authenticity and manufacturing of the article 5 contained in the tag information.

In an exemplary aspect, the processor 7a can be configured from a plurality of CPUs, microprocessors, or field programmable gate arrays (FPGAs), or it may be integrated into one CPU, one microprocessor, or one FPGA. The processor 7a may include at least one of a hard disc, a memory, and a solid state drive (SSD) in order to memorize various types of information, for example. The display 7c is, for example, a liquid crystal display. Moreover, the input part 7c is a keyboard or a mouse, for example.

The RFID tag reading system 1 includes a communication network 9 such as an Internet connection and a server 11 configured to query tag information read via the communication network 9. This configuration allows tag information to contain proper ID information related to at least one of manufacturing information and authenticity information of the article 5, instead of the tag information containing the authenticity information or the manufacturing information. The processor 7a of the host computer 7 queries the server 11 about the proper ID information read from the RFID tag 21, whereby the authenticity information and manufacturing information of the article 5 can be obtained.

The server 11 is configured to store information regarding the manufacturing information and the authenticity information of the article 5. Even in case the authenticity information and manufacturing information are contained in the tag information, it can be verified whether that information is correct by querying the server 11. The server 11 is configured from, for example, at least one of the hard disc, the memory, and the solid state drive (SSD).

Figure 2:
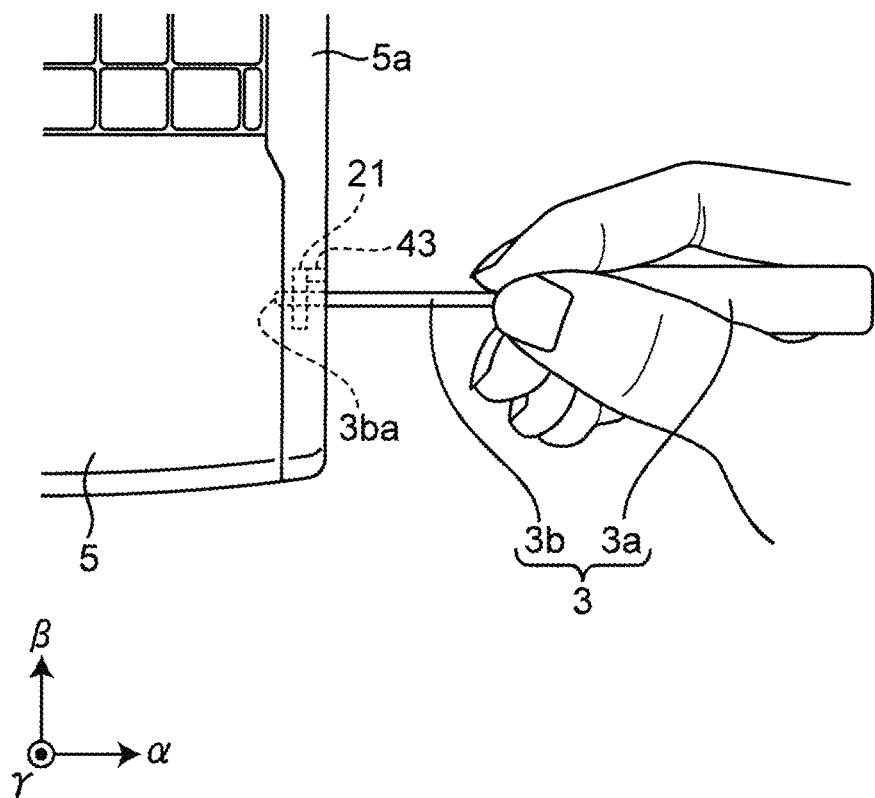
FIG. 2 is an explanatory view illustrating a state where a reader device is used.

Referring next to FIG. 2, a usage state of the reader device 3 will be described. FIG. 2 is an explanatory view illustrating a state where the reader device 3 is used. The RFID tag 21 is disposed in a vicinity of the hole 5b within the interior of the article 5. The RFID tag 21 is supported by a support part 43 formed from an insulator. The support part 43 is fitted to the case 5a. In an exemplary aspect, the user previously informed of a location where the RFID tag is disposed inserts a rod tip 3ba at the tip of the rod 3b into the hole 5b. The rod 3b inserted to intersect the RFID tag 21 reads tag information from the RFID tag. A structure of the RFID tag 21 will next be described.

Figure 3:
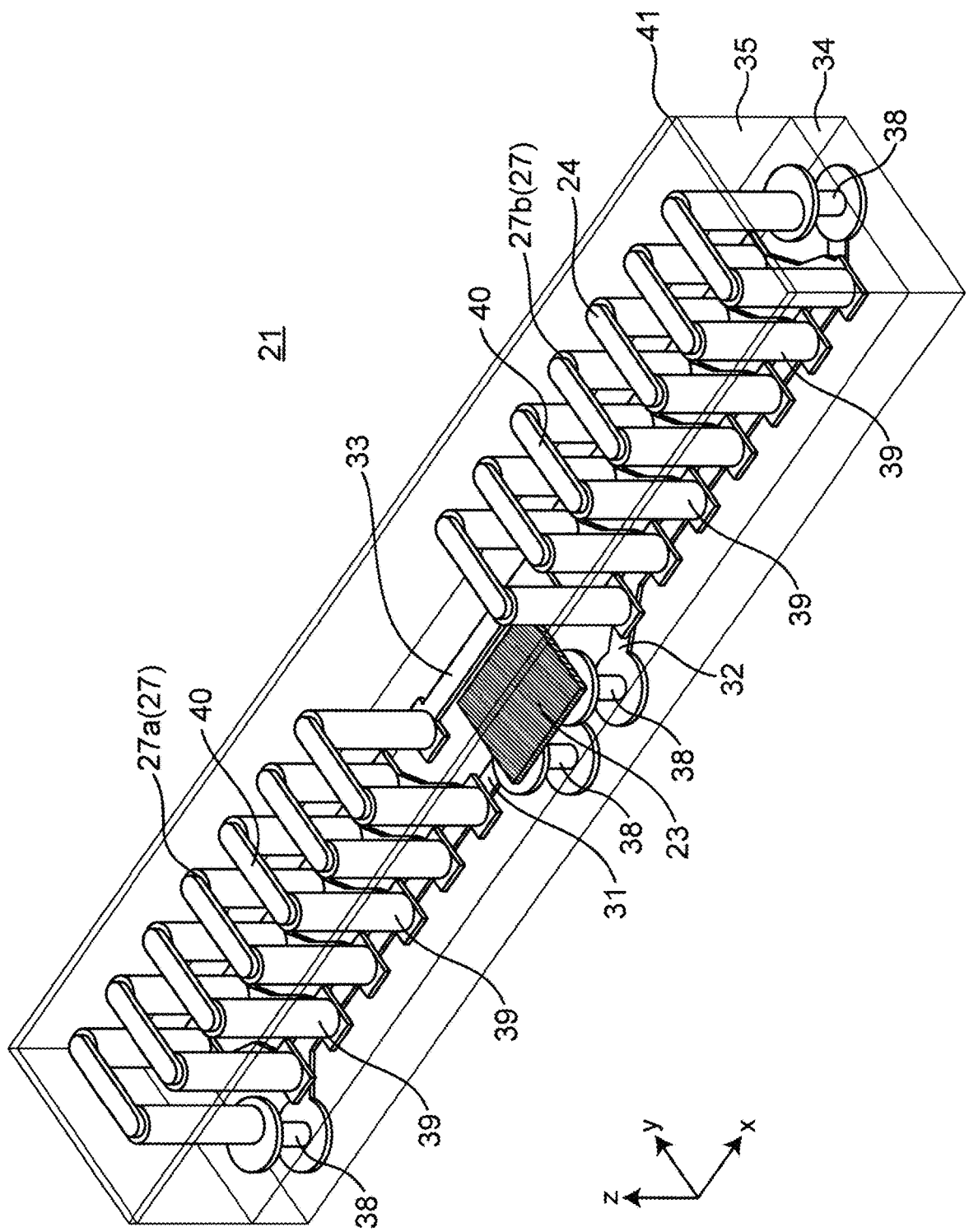
FIG. 3 is a perspective view showing an RFID tag.

FIG. 3 is a perspective view showing the RFID tag 21 of the first exemplary embodiment. To facilitate understanding of the configuration of the first embodiment, FIG. 3 shows an RFIC element 23, a wiring pattern, and the like disposed inside the RFID tag 21. In FIG. 3, x, y, and z axes orthogonal to one another are shown for convenience. The x, y, and z axes are used in describing the longitudinal direction (x direction), the width direction (y direction), and the height direction (z direction) of the RFID tag 21 of the first embodiment, for example.

As further shown, the RFID tag 21 has an elongated substantially rectangular parallelepiped shape. The RFID tag 21 having the RFIC element 23 as an IC chip, a loop antenna 27, etc. are made into a block of a rigid resin material such as a thermosetting resin represented by an epoxy resin material.

Figure 4:
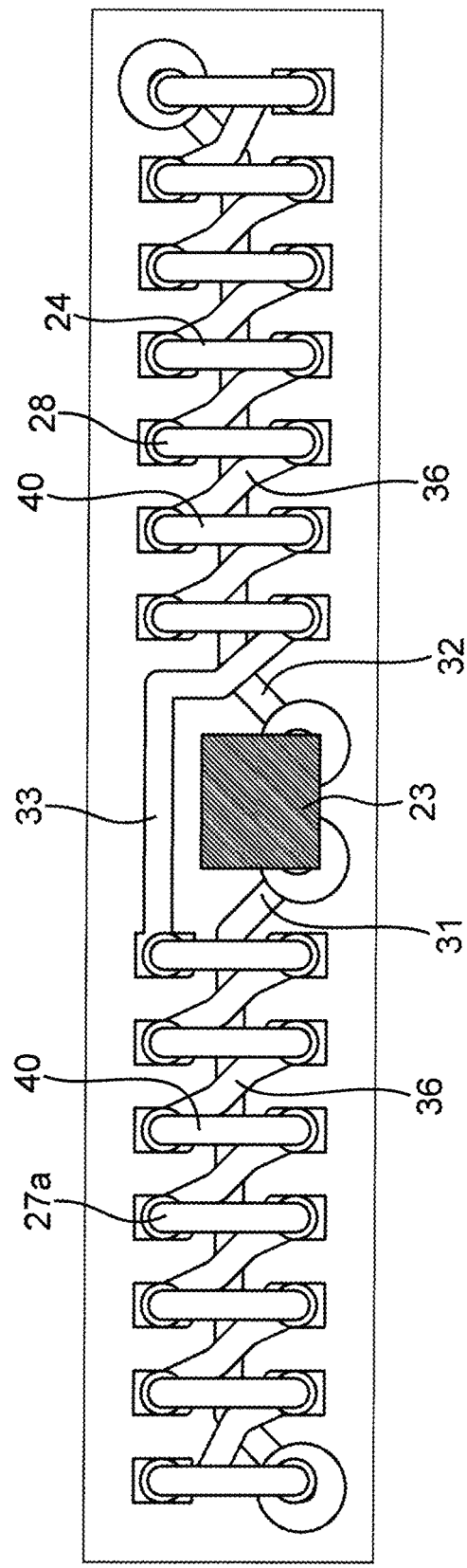
FIG. 4 is a diagram showing an inner configuration of the RFID tag.
Figure 5:
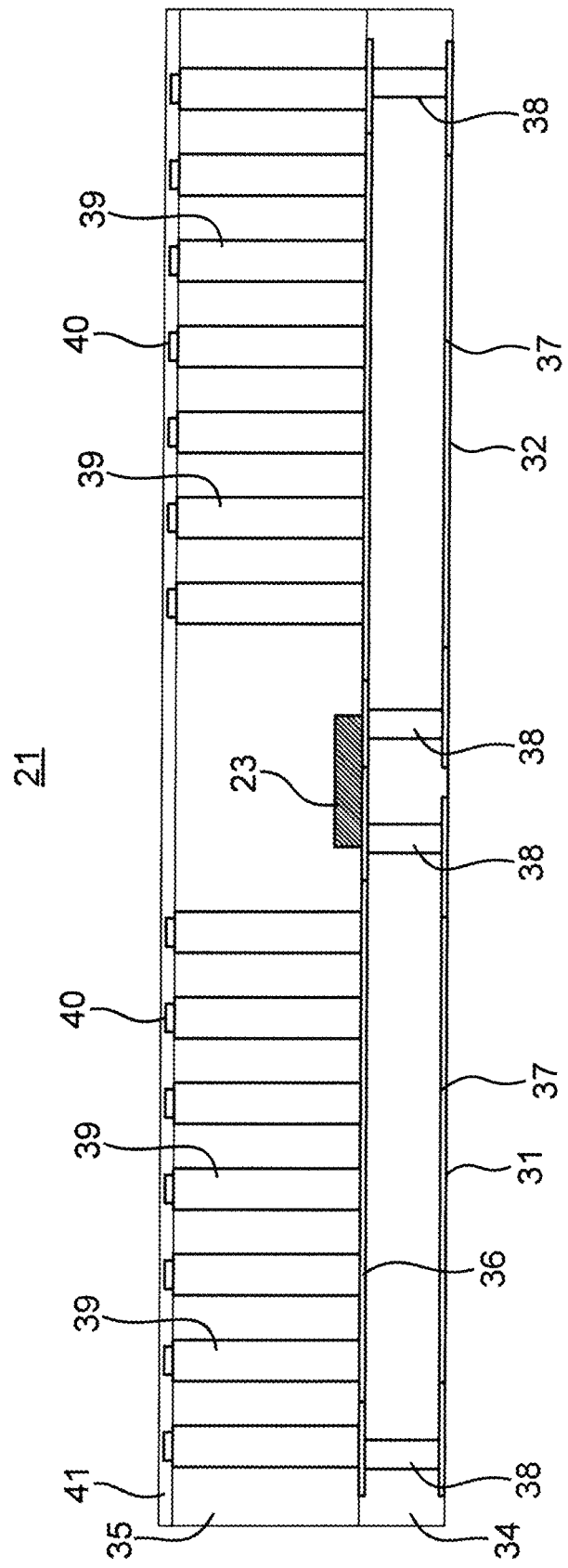
FIG. 5 is a front view of the RFID tag viewed in its width direction.
Figure 6:
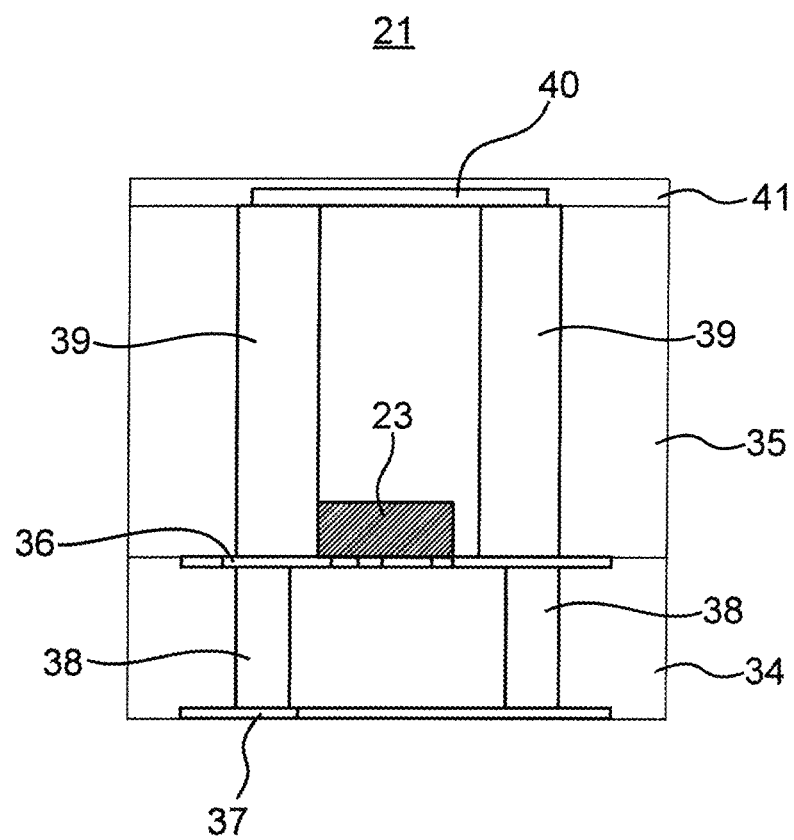
FIG. 6 is a side view of the RFID tag viewed in its longitudinal direction.

FIG. 4 to FIG. 7c are diagrams showing internal configurations of the RFID tag 21 of the first embodiment. In FIGS. 4 to 6, resin materials of the RFID tag 21 are invisible to show only the internal configurations for easy understanding. FIG. 4 is a diagram illustrating the internal configuration of the RFID tag 21 seen when the RFID tag 21 in a plan view thereof. FIG. 5 is a front view of the RFID tag 21 viewed in its width direction (y direction), and FIG. 6 is a side view of the RFID tag 21 viewed in its longitudinal direction (x direction).

As shown in FIG. 4, the RFID tag 21 includes in its interior the RFIC element 23 as the IC chip, a first feed coil 27a and a second feed coil 27b making up the loop antenna 27, and a plurality of connecting conductors 31, 32, and 33 electrically connecting these.

As shown in the front view of FIG. 5, the RFID tag 21 has a three-layer structure in which a resin block 35 is formed (e.g., disposed) on a printed wiring board 34, with a protective layer (e.g., a cover lay) 41 formed on the resin block 35. Conductor patterns 36 and 37 are respectively formed on an upper surface and a lower surface (i.e., first principal surface and second principal surface) of the printed wiring board 34 as the bottom layer. A conductor pattern 40 is formed on a top surface of the resin block 35. These conductor patterns 36, 37, and 40 are formed from, for example, plating films of Cu, or the like, in the form of conductor films of Cu film, etc. and are formed by patterning such as photoresists and etching. The conductor patterns may be formed by screen printing of a conductive paste.

The conductor patterns are electrically connected by via hole conductors 38, metal pins 39, and connecting conductors 31, 32, and 33 described later so as to obtain a desired wiring pattern 24. The via hole conductors 38 formed in the printed wiring board 34 electrically connect the upper-surface-side conductor pattern (i.e., first-principal-surface-side conductor pattern: second conductor pattern) 36 and the lower-surface-side conductor pattern (i.e., second-principal-surface-side conductor pattern: third conductor pattern) 37. The metal pins 39 disposed extending vertically through the resin block 35 electrically connect has the upper-surface-side conductor pattern (i.e., second conductor pattern) 36 of the printed wiring board 34 and the top-surface-side conductor pattern 40 formed on the top surface of the resin black 35 (i.e., first conductor pattern). The top-surface-side conductor pattern 40 of the resin block 35 is protected by the protective layer (e.g., cover lay) 41.

In an exemplary aspect, the metal pin 39 can be a columnar metal block, such as a columnar pin made of Cu, for example. In the first embodiment, a Cu wire with a circular section is cut to a predetermined length for use. The metal pin 39, however, is not required to have the circular section.

As described above, the three conductor patterns 36, 37, and 40 are connected to the via hole conductors 38 and the metal pins 39, to thereby form the wiring pattern 24 for the RFIC element 23 as the IC chip of the RFID tag 21 of the first embodiment. FIG. 7 is a diagram illustrating the three conductor patterns 36, 37, and 40 of the RFID tag 21 of the first embodiment.

Figure 7B:
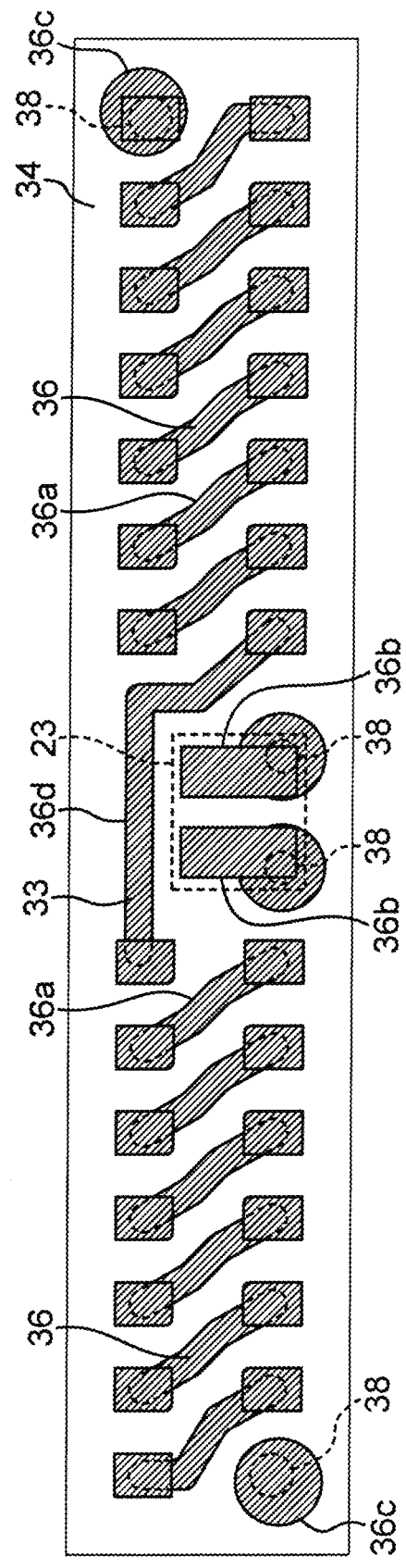
FIG. 7b is a diagram showing a conductor pattern of the RFID tag.

FIG. 7a is a plan view showing the top-surface-side conductor pattern (i.e., a first conductor pattern) 40 formed on the top surface of the resin block 35. FIG. 7b is a plan view showing the upper-surface-side conductor pattern (i.e., a second conductor pattern) 36 of the printed wiring board 34 and FIG. 7c is a back view showing the lower-surface-side conductor pattern (i.e., a third conductor pattern) 37 of the printed wiring board 34.

The first conductor pattern 40 shown in FIG. 7a is electrically connected to a top-surface-side end of the metal pin 39 passing through the resin block 35, to thereby form a desired wiring pattern 40a. The second conductor pattern 36 shown in FIG. 7b has a wiring pattern 36a electrically connected to a bottom-surface-side end of the metal pin 39 passing through the resin block 35. The second conductor pattern 36 has a wiring pattern 36b connecting two input/output terminals of the RFIC element 23 as the IC chip via the via hole conductors 38 to the third conductor pattern 37 formed on the lower surface side of the printed wiring board 34, a wiring pattern 36c for connecting from the third conductor pattern 37 via the via hole conductors 38 to the metal pins 39, and a wiring pattern 36d acting as the connecting conductor (i.e., a third connecting conductor 33) electrically connecting the first feed coil 27a and the second feed coil 27b.

Figure 7C:
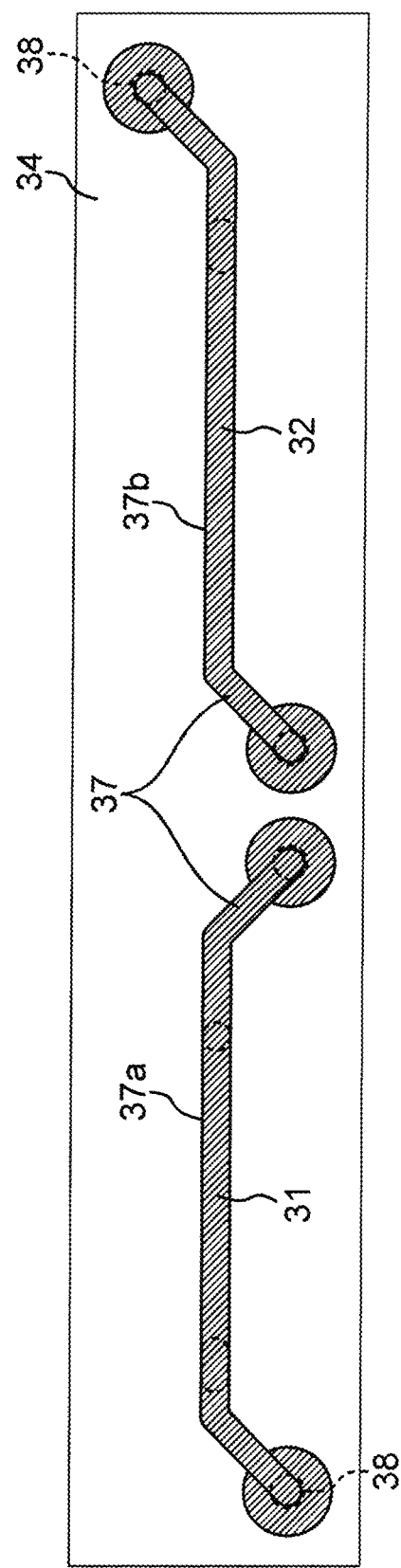
FIG. 7c is a diagram showing a conductor pattern of the RFID tag.

The third conductor patterns 37 shown in FIG. 7c includes wiring patterns 37a and 37b on the second principal surface that is a surface opposite to the first principal surface of the printed wiring board 34 mounted with the RFIC element 23. In the third conductor pattern 37, the wiring patterns 37a and 37b extend from the input/output terminals of the RFIC element 23 mounted on the elongated printed wiring board 34 at its substantially center, via the via hole conductors 38 formed directly under the terminals, to the positions of distal ends in the vicinity of both ends in the longitudinal direction of the printed wiring board 34. In FIG. 7c, the wiring pattern 37a on the left side acts as the first connecting conductor 31 and the wiring pattern 37b on the right side acts as the second connecting conductor 32. The first connecting conductor 31 and the second connecting conductor 32 form a current path extending substantially rectilinearly in the left-right directions (x direction).

As described above, the interior of the RFID tag 21 has the RFIC element 23 as the IC chip disposed therein and has the wiring pattern 24 formed therein, the wiring pattern connecting the first feed coil 27a and the second feed coil 27b formed as described above to the RFIC element 23 via the three connecting conductors 31, 32 and 33.

As shown in FIG. 3, the first feed coil 27a and the second feed coil 27b are arranged on both sides of the RFIC element 23 as the IC chip, with coil center axes of the first and the second feed coil 27a and 27b are formed substantially the same. In other words, winding axes of the first and the second feed coils 27a and 27b are substantially coaxial.

The first connecting conductor 31 connected to and derived from a first input/output terminal as one of the input/output terminals of the RFIC element 23 extends through the underside of the first feed coil 27a, to connect to a distal end of the first feed coil 27a from the RFIC element 23. Similarly, the second connecting conductor 32 connected to and derived from a second input/output terminal as the other of the input/output terminals of the RFIC element 23 extends through the underside of the second feed coil 27b, to connect to a distal end of the second feed coil 27b from the RFIC element 23. A proximal end of the first feed coil 27a is connected via the third connecting conductor 33 to a proximal end of the second feed coil 27b. That is, the third connecting conductor 33 is a shorter line than the first and the second conductors 31 and 32 and is a short rectilinear current path substantially detouring the RFIC element 23 as the IC chip.

A specific configuration of the RFID tag 21 of the first embodiment can be a substantially rectangular parallelepiped shape having approx. 1.0 mm square and a length of approx. 5.0 to 6.0 mm, for example. The first feed coil 27*a* and the second feed coil 27*b* have substantially the same configuration and shape and are configured in the same number of turns.

Figure 8:
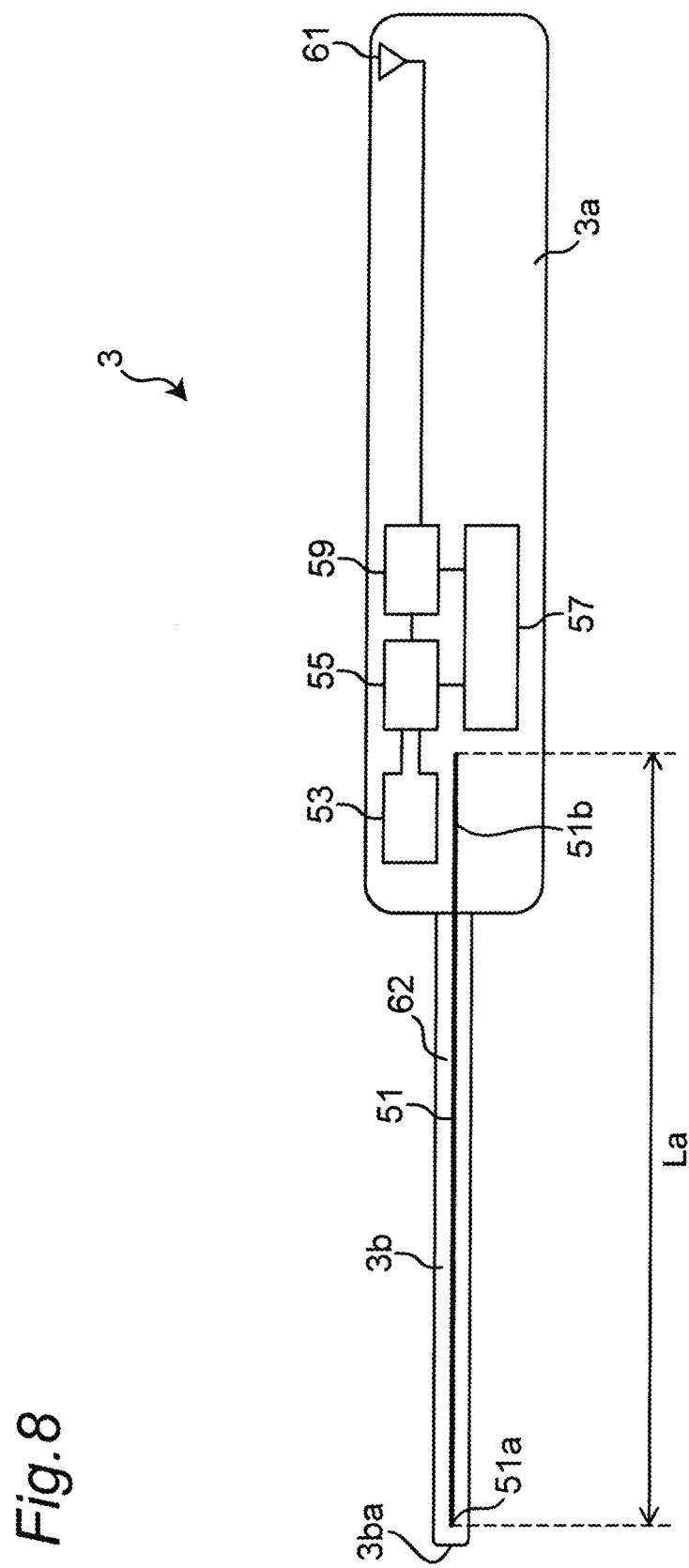
FIG. 8 is a diagram illustrating a configuration of a reader device of the first exemplary embodiment.

Referring next to FIG. 8, a configuration of the reader device 3 will be described. FIG. 8 is a diagram illustrating the configuration of the reader device. The reader device 3 includes a rectilinear linear antenna 51, a feed loop 53 magnetic field coupled with a base 51*b* of the linear antenna 51, a reader IC 55 connected to the feed loop 53, a battery 57 supplying power to the reader IC 55 and a wireless LAN IC 59, the wireless LAN IC 59 connecting to the reader IC 55, and a wireless LAN antenna 61 connected to the wireless LAN IC 59.

The linear antenna 51 is a rectilinear conductor and can be a metal conductor, for example. A tip 51*a* at one end of the linear antenna 51 is an open end. The base 51*b* at the other end of the linear antenna 51 is disposed facing the feed loop 53 at an interval. The base 51*b* is electromagnetically coupled with the feed loop 53 and is magnetic field coupled therewith in the first embodiment. The linear antenna 51 may be a flat conductor, and the base 51*b* side of the linear antenna 51 may be formed by the wiring pattern.

The base 51*b* of the linear antenna 51, the feed loop 53, the reader IC 55, the battery 57, the wireless LAN IC 59, and the wireless LAN antenna 61 are housed in the enclosure 3*a*. The wireless LAN antenna 61 is disposed on a rear end side of the enclosure 3*a*, i.e., opposite to the rod 3*b* of the enclosure 3*a*. The rest including the tip 51*a* of the linear antenna 51 is disposed within the rod 3*b*.

The rod 3*b* is configured from the linear antenna 51 extending from the enclosure 3*a* and an insulating protector 62 covering the extended linear antenna 51. The rod 3*b* may have rigidity or flexibility. A full length LA of the linear antenna 51 is shorter than a length of a half wavelength ($\lambda/2$) of the wavelength $\lambda$ of frequencies for communication with the RFID tag 21. In the first embodiment, for example, UHF band communication frequency bands are adopted and the length La is equal to or less than 15 cm.

If the length La of the linear antenna 51 is longer than the half wavelength ($\lambda/2$) of the wavelength of the communication frequencies, a node constantly having 0 current value occurs at a point on the linear antenna 51 with a length of the half wavelength ($\lambda/2$). Any magnetic field does not take place in the vicinity of the node on the linear antenna 51. Therefore, depending on a positional relationship seen when the rod 3*b* is inserted, a portion without any magnetic field of the linear antenna 51 and the RFID tag 21 become close to each other, so that the tag information may not be read. If the length La of the linear antenna 51 is shorter than the half wavelength ($\lambda/2$), such a phenomenon never occurs, so that the tag information can be accurately read from the RFID tag 21.

FIG. 8 shows the feed loop 53 as a single winding coil for a simple description. The feed loop 53 may be either the single winding coil or a multiple winding coil according to exemplary aspects. Furthermore, the feed loop 53 is configured to receive tag information from the linear antenna 51.

The reader IC 55 is an IC chip for reading tag information stored in the RFID tag. The reader IC 55 reads the tag information received by the linear antenna 51.

The wireless LAN IC 59 is an IC chip configured to convert the read tag information into communication signals for the wireless LAN. The converted communication signals for the wireless LAN are transmitted from the wireless LAN antenna 61 to the antenna 7*b* of the host computer 7. For example, Wi-Fi®, Bluetooth®, bluetooth low energy (BLE), and the like, can be used as communication standards for the wireless LAN. Instead of a wireless connection by the wireless LAN antenna 61 and the antenna 7*b*, the reader device 3 and the host computer 7 may be connected using a coaxial cable, or the like.

Figure 9:
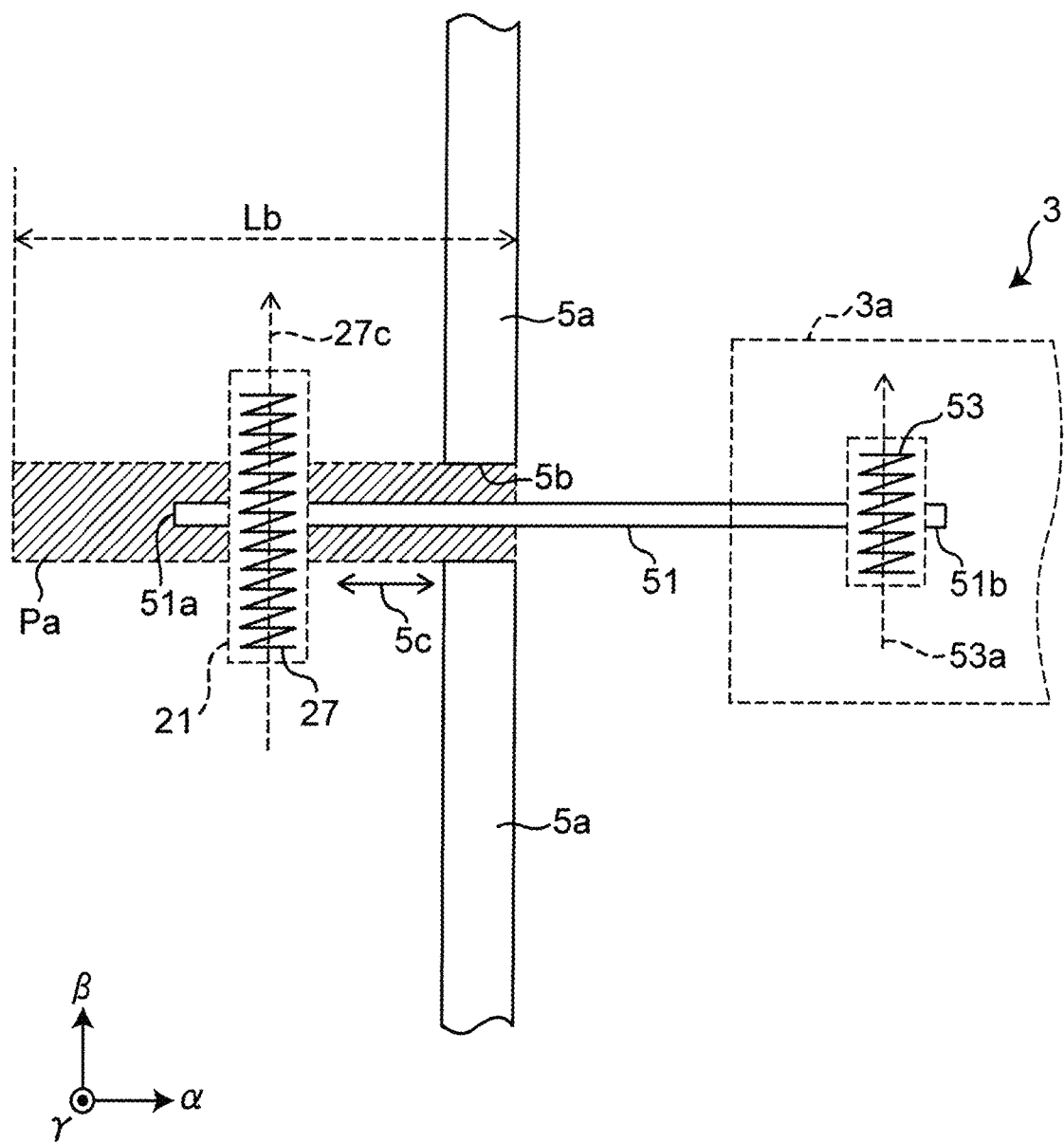
FIG. 9 is an explanatory view illustrating a positional relationship between a linear antenna and the RFID tag.

Referring next to FIG. 9, a positional relationship between the linear antenna and the RFID tag will be described. FIG. 9 is an explanatory view showing the positional relationship between the linear antenna and the RFID tag. FIG. 9 is a top view on an $\alpha$-$\beta$, plane, with the case 5*a* being shown in section. Main constituent elements needed for explanation are shown in FIG. 9.

Although the base 51*b* of the linear antenna 51 of the reader device 3 is disposed intersecting the direction of a loop axis 53*a* of the feed loop 53 of the reader device 3, the linear antenna 51 is disposed parallel to a current passing through the feed loop 53. Accordingly, even when the feed loop 53 is configured from the single winding coil, for example, the feed loop 53 is disposed such that the base 51*b* of the linear antenna 51 is orthogonal to the direction of and the loop axis 53*a* of the feed loop 53. The feed loop 53 and the base 51*b* of the linear antenna 51 may be directly connected or electromagnetic field coupled. The RFID tag 21 is disposed such that the direction of a loop axis 27*c* (coil axis) of the loop antenna 27 of the RFID tag 21 intersects a direction (depth direction) 5*c* in which the hole 5*b* formed in the case 5*a* passes through, and, for example, such that the direction of the loop axis 27*c* of the loop antenna 27 of the RFID tag 21 is orthogonal to a passing-through direction 5*c* of the hole 5*b* formed in the case 5*a*. The direction of the loop axis 27*c* of the loop antenna 27 of the RFID tag 21 is not perpendicular to a wall surface of the case 5*a* having the hole 5*b* formed therein, but is located intersecting or parallel to the wall surface. Thereby, the direction of current flowing through the linear antenna 51 and the direction of current flowing through the loop antenna 27 of the RFID tag 21 coincide, so that the linear antenna 51 and the loop antenna 27 of the RFID tag 21 can be magnetic field coupled.

Let a projected area Pa be an area on which an area of the opening of the hole 5*b* is projected in the passing-through direction (e.g., a depth direction). Lb is a length in the passing-through direction of the projected area Pa. In the exemplary aspect, the length Lb is shorter than the length of the rod 3*b* of the reader device 3. For example, the length Lb may be shorter than half ($\lambda/2$) of the wavelength $\lambda$ of communication frequencies and be within a range equal to or more than 1 mm and equal to or less than 10 mm. In a top view and a side view, the RFID tag 21 is disposed overlapping with the projected area Pa. The tip 51*a* of the linear antenna 51 of the reader device 3 is inserted up to an inward position beyond the loop antenna 27 of the RFID tag 21 in the passing-through direction of the hole 5*b*.

Figure 10:
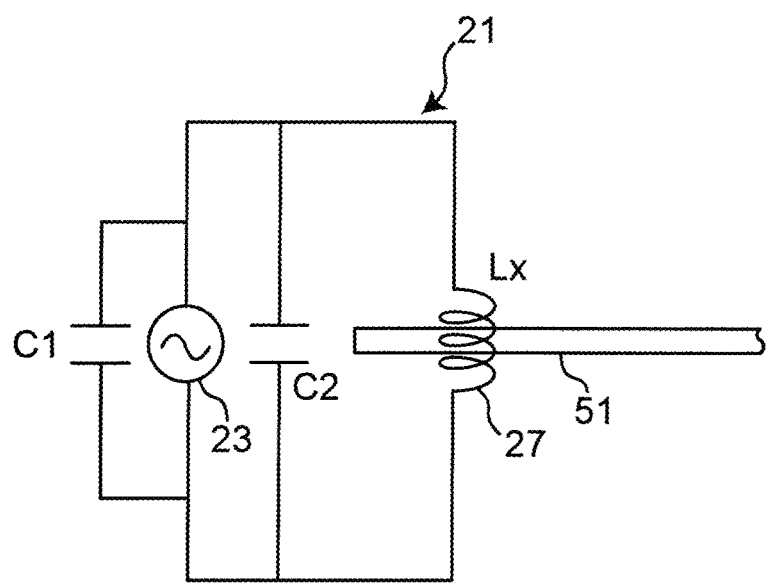
FIG. 10 is a diagram schematically illustrating a circuit configuration of the RFID tag.

FIG. 10 is a diagram schematically illustrating a circuit configuration of the RFID tag 21. An inductance value of the loop antenna 27 is Lx. The loop antenna 27 is connected to both sides of the RFIC element 23 as the IC chip. A capacitor C1 is connected to the both sides of the RFIC element 23. A capacitor C2 is connected also to both sides of the loop antenna 27. The capacitor C2 may be omitted depending on the type of the RFIC element 23.

It is noted that the configuration of the RFID tag 21 is not limited to the configuration illustrated. The RFID tag 21 only needs to include the loop antenna 27 magnetic field coupled with the linear antenna 51 and the number of turns, the size, and the dimension ratio of the loop antenna may be different from the configurations illustrated in this application.

Figure 11:
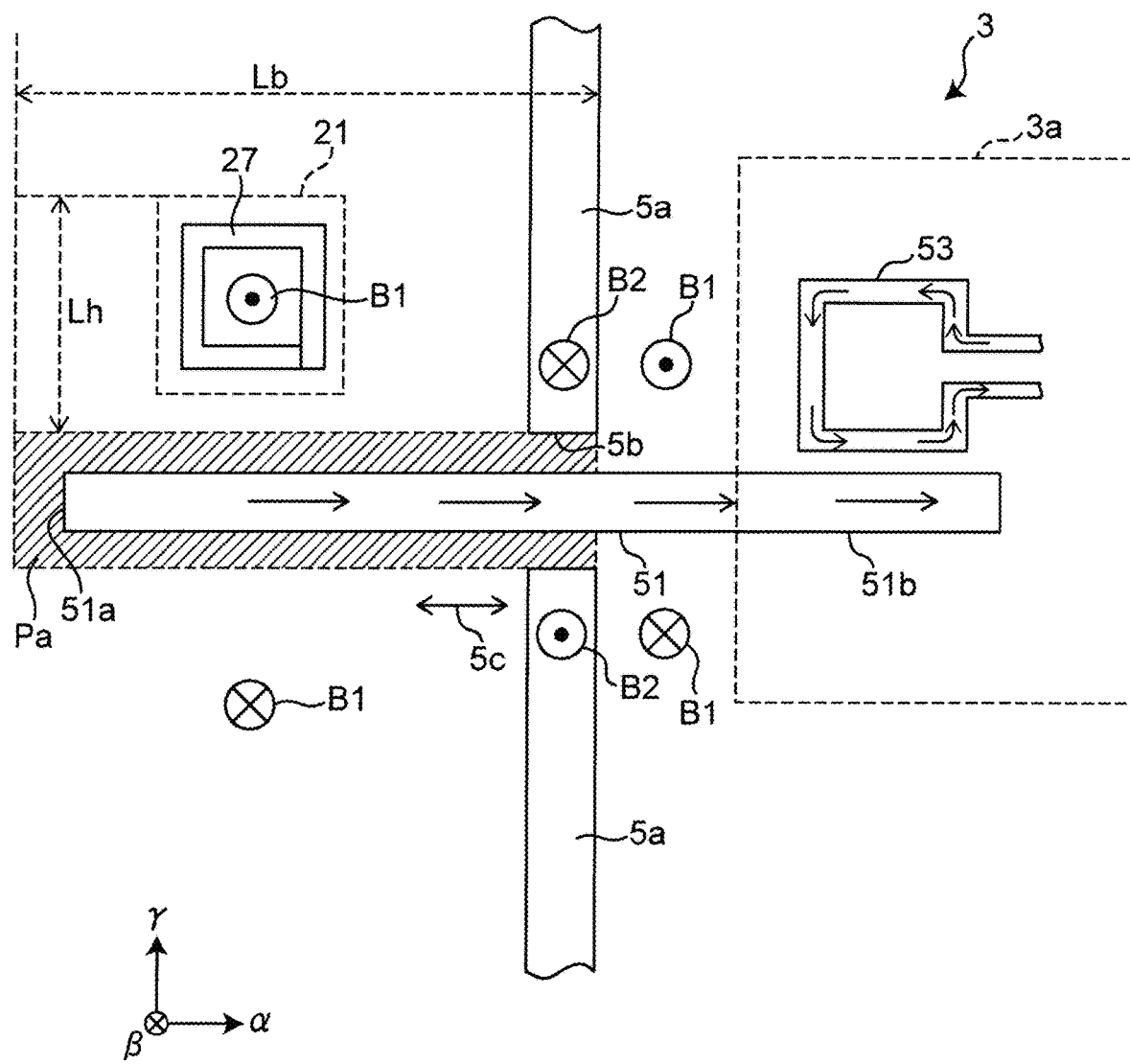
FIG. 11 is an explanatory view explaining a magnetic field occurring around the linear antenna.

Referring next to FIG. 11, magnetic field coupling of the linear antenna 51 and the RFID tag 21 will be described. FIG. 11 is an explanatory view describing a magnetic field occurring around the linear antenna. FIG. 11 is a diagram viewed from a side on an α-γ plane, showing longitudinal sections of members. Main constituent elements needed for explanation are shown in FIG. 11.

If a power of approximately 250 mW, for example, is applied to the feed loop 53, current flows within the feed loop 53 in the direction of an arrow shown in FIG. 11. Since current flows within the looped wiring, a magnetic field occurs around the feed loop 53. This magnetic field excites the linear antenna 51 and generates a high-frequency current in the linear antenna 51. Within the linear antenna 51, the high-frequency current flows in the same direction as in the wiring of the feed loop 53 facing the antenna, so that a magnetic field B1 occurs around the linear antenna 51 as a central axis over the full length of the linear antenna 51. That is, the linear antenna 51 is configured to function as a magnetic field antenna. If the tip 51a of the linear antenna 51 and the RFID tag 21 are brought into close proximity within approx. 10 mm, the magnetic field B1 occurring from the linear antenna 51 passes through the interior of the loop antenna 27 of the RFID tag 21, with the result that current flows through the loop antenna 27. By allowing the linear antenna 51 and the looped antenna 27 to be magnetic field coupled in this manner, current can flow through the RFID tag 21 so that the tag information can be read.

In the case 5a, there occurs a magnetic field B2 opposite to the magnetic field B1 generated by the linear antenna 51. As a result, in a case that the linear antenna 51 is not inserted into the case 5a, the magnetic field B1 from the linear antenna 51 external to the case 5a does not enter the interior of the case 5a because of the shielding effect of the case 5a. Therefore, the linear antenna 51 cannot be magnetic field coupled with the RFID tag 21 without the antenna being put into the case 5a.

According to the exemplary aspect, the distance from the hole 5b of the case 5a to the RFID tag 21 is shorter than half (λ/2) of the wavelength λ of frequencies for communications with the RFID tag 21. Furthermore, the length Lb of the projected area Pa is shorter than the length of the linear antenna 51 extending from the enclosure 3a of the reader device 3. Accordingly, when the rod 3b of the reader device 3 is inserted into the hole 5b, the tip 51a of the linear antenna 51 is positioned at an inward position in the passing-through direction 5c of the hole 5b of the article 5 beyond the loop axis 27c of the loop antenna 27 of the RFID tag 21, so that the magnetic field radiated from the linear antenna 51 can pass through the interior of the loop antenna 27. In this way, the linear antenna 51 is configured to function as the magnetic field antenna.

Moreover, the RFID tag 21 can be disposed in the projected area Pa or at least a part of the RFID 21 may be disposed in the projected area Pa. The RFID tag 21 may be disposed away from the projected area Pa. In this case, it is preferable that the RFID tag 21 be located in the vicinity of the projected area Pa and the tag is located within a distance Lh from the projected area Pa. The distance Lh is a distance the magnetic field B1 generated by the linear antenna 51 reaches.

By putting the linear antenna 51 within the case 5a, communication electromagnetic waves are transmitted to the interior of the case 5a through the linear antenna 51, so that the communication electromagnetic waves can be generated from the interior of the case 5a. Thus, the communication electromagnetic waves can be supplied into the interior of the case 5a shielded by the metal case 5a.

The reader device 3 can be a reader writer having a function of writing tag information into the RFID tag 21, and in such a case, the reader device 3 can add information on manufacturing, etc. to the tag information.

Figure 12:
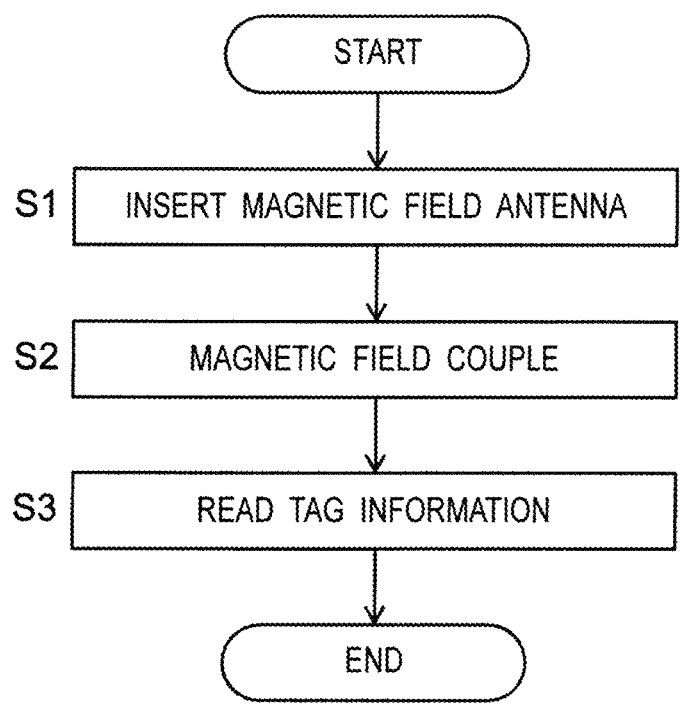
FIG. 12 is a flowchart showing a flow of reading information of the RFID tag.

Referring next to FIG. 12, a method for reading the RFID tag 21 housed in the interior of the case 5a of the article 5 will be described. FIG. 12 is a flowchart showing a procedure for reading the RFID tag.

At step S1, the tip 51a of the linear antenna 51 is inserted through the hole 5b formed in the case 5a into the interior of the case 5a by using the reader device 3 with the linear antenna 51 having the tip 51a as the open end. At step S2, the linear antenna 51 within the case 5a and the RFID tag 21 are magnetically coupled. This coupling occurs when the user inserts the rod 3b up to a predetermined depth within the case 5a. At step S3, the reader device 3 reads tag information stored in the RFID tag. Thereafter, the tag information is sent to the host computer 7. Authenticity information or manufacturing information contained in the sent tag information is displayed on the display 7c so that the user can verify the information. In a case that tag information contains the proper ID information, the host computer 7 queries the server 11 about the proper ID information, thereby enabling the user to verify the information on authenticity or manufacturing of the article 5.

Thus, the method for reading the RFID tag 21 stored within the case 5a of the article 5 of a first exemplary embodiment includes the step S1 at which the tip 51a of the linear antenna 51 is inserted into the case 5a through the hole 5b formed in the case 5a by using the reader device 3 with the linear antenna 51 having the tip 51a as the open end; the step S2 at which the linear antenna 51 within the case 5a and the RFID tag 21 are magnetically coupled; and the step S3 at which the reader device 3 reads the tag information stored in the RFID tag. The tip 511 of the linear antenna 51 is not of a looped shape, so that the tip can be inserted into a small hole formed in the article 5. The tag 21 is housed within the case 5a of the article 5, with the result that the RFID tag 21 is not easily visible through the hole 5b in appearance and illegal activities on the RFID tag 21 are effectively prevented. The dimension of the hole 5b may be as large as the open-end antenna can be inserted, so that damage to the design-ability of the article 5 can be reduced.

Moreover, the reader device 3 of the first exemplary embodiment includes the reader IC 55 for tag information stored in the RFID tag 21; the linear antenna 51 having the tip 51a at its one end as the open end; and the feed loop 53 connected to the reader IC 55 and electromagnetically coupled with the base 51b at the other end of the linear antenna 51. The tip 51a of the linear antenna is the open end and hence the tip 51a is not a looped shape. Therefore, the dimension of the tip 51a of the linear antenna can be drastically thinner so that the tip 51a can be inserted into the small hole 5b formed in the article 5. Therefore, even the RFID tag 21 housed within the article 5 can send wireless communication signals to the interior of the article 5 from the feed loop 53 of the reader device 3 via the linear antenna 51, by inserting the linear antenna 51 used as the magnetic field antenna into the hole 5b of the article 5. The RFID tag 21 disposed inside the article 5 is not easily visible through the hole in appearance and illegal activities on the RFID tag 21 are effectively prevented. The dimension of the hole 5b may be as large as the open-end antenna can be inserted, whereupon damage to the design-ability of the article 5 can be reduced.

The article 5 of the first exemplary embodiment includes the case 5a with the hole 5b passing through from the exterior to the interior and the RFID tag 21 housed within the case 5a and having the loop antenna 27, with the RFID tag 21 being disposed such that the passing-through direction 5c of the hole 5b intersects with the direction of the loop axis 27c of the loop antenna 27. Thereby, magnetic field coupling with the linear antenna 51 inserted from the hole 5b can be efficiently achieved. Since the RFID tag 21 is disposed inside the case 5a of the article 5, the RFID tag 21 is not easily visible through the hole in appearance and illegal activities on the RFID tag 21 are effectively prevented.

The reading system 1 of the RFID tag 21 of the first embodiment includes the article 5 to which the RFID tag 21 is attached and the reader device 3 of the RFID tag 21, the article 5 including the case 5a with the hole 5b passing through from the exterior to the interior, the reader device 3 including the reader IC 55 for tag information stored in the RFID tag, the linear antenna 51 having the open-end tip 51a at its one end which can be inserted into the hole 5b, and the feed loop 53 connected to the reader IC 55 and electrically coupled with the base 51b at the other end of the linear antenna 51, the RFID tag 21 having the loop antenna 27 and being stored within the case 5a and disposed such that the passing-through direction of the hole 5b intersects with the direction of the loop axis 27c of the loop antenna 27. Since the RFID tag 21 is housed within the case 5a of the article 5, the RFID tag 21 is not easily visible through the hole 5b in appearance and illegal activities on the RFID tag 21 are effectively prevented.

Second Exemplary Embodiment

Figure 13:
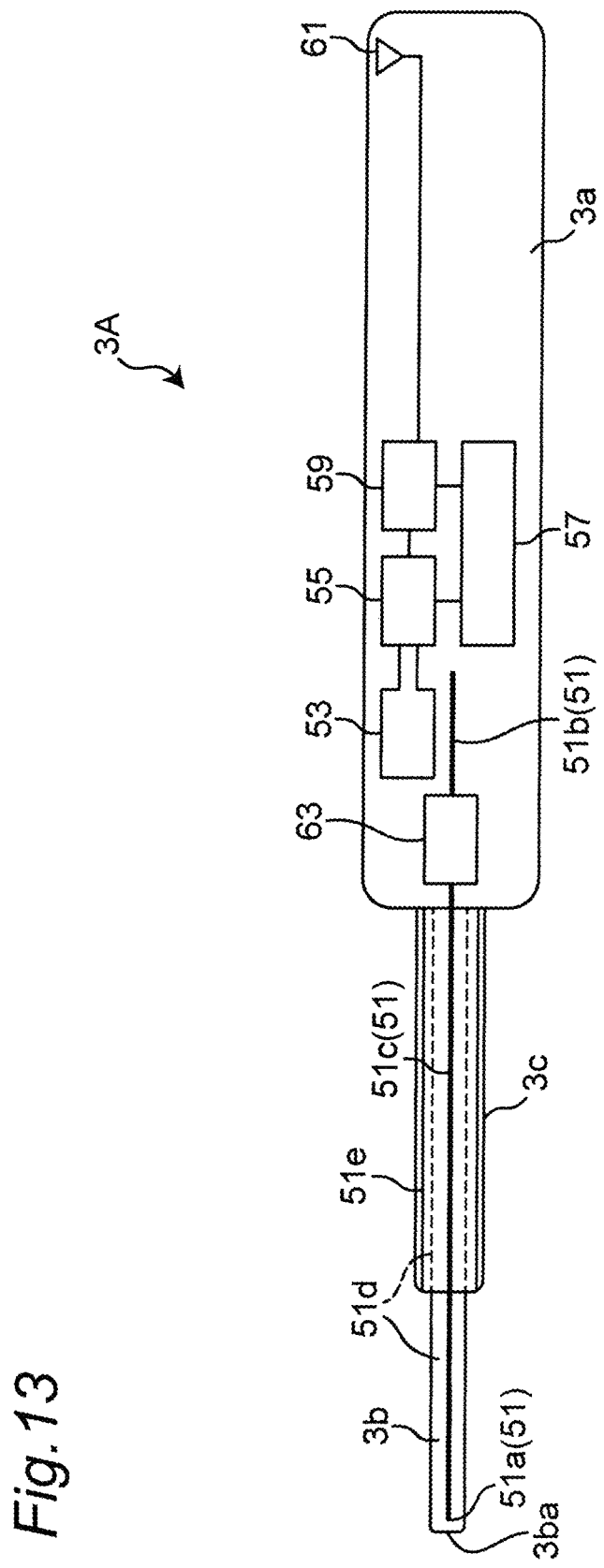
FIG. 13 is a diagram illustrating a configuration of a reader device of a second exemplary embodiment.

Referring next to FIG. 13, a reader device according to a second exemplary embodiment of the present invention will be described. FIG. 13 is a diagram illustrating a configuration of the reader device of the second embodiment.

In contrast with the reader device 3 of the first embodiment with the linear antenna 51 extending from the enclosure 3a, a reader device 3A of the second embodiment has a coaxial cable extending from an enclosure 3a. The reader device 3A of the second embodiment has the linear antenna 51 a part of which is an inner conductor 51c of the coaxial cable 3c. Except items described below, the reader device 3A of the second embodiment has a configuration common to the reader device 3 of the first embodiment.

In addition to the configuration of the reader device 3 of the first embodiment, the reader device 3A of the second embodiment further includes the coaxial cable 3c extending from the enclosure 31a and a matching circuit 63 disposed between the coaxial cable 3c and the base 51b of the linear antenna 5.

The coaxial cable 3c includes the inner conductor 51c, an insulator 51d surrounding the inner conductor 51c, and an outer conductor 51e surrounding the insulator 51d. The insulator 51d is disposed between the inner conductor 51c and the outer conductor 51e. A part of the linear antenna 51 is the inner conductor 51c of the coaxial cable 3c, while the tip 51a side of the linear antenna 51 is the coaxial cable 3c with the insulator 51d exposed surrounding the inner conductor 51c. That is, the outer conductor 51e is removed on the end of the tip 51a side of the linear antenna 51.

Figure 14:
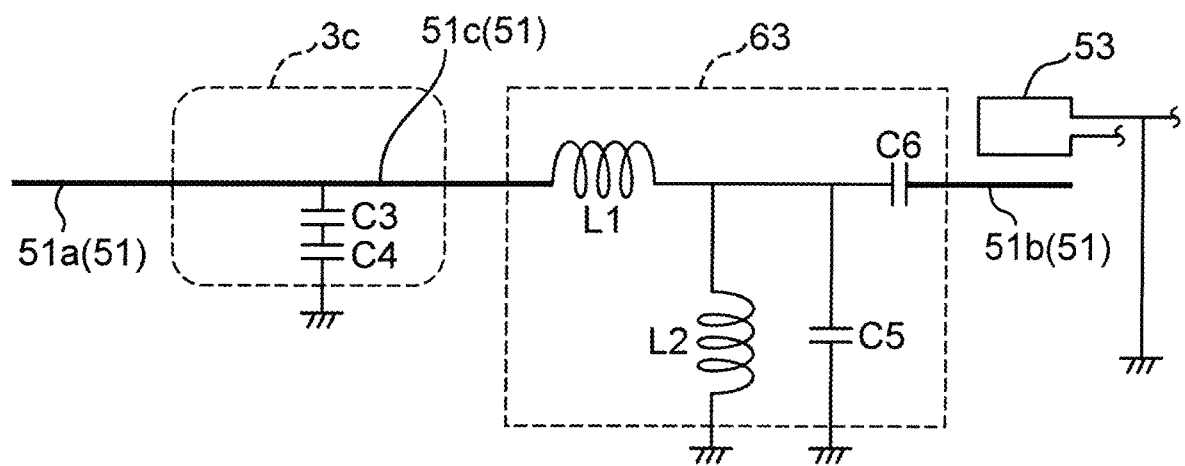
FIG. 14 is a diagram schematically illustrating a circuit configuration of the reader device of the second exemplary embodiment.

Referring to FIG. 14, a circuit of the reader device 3A of the second embodiment will be described. FIG. 14 is a diagram schematically illustrating a circuit configuration of the reader device of the second embodiment.

In the coaxial cable 3c there exist capacitances C3 and C4 between the inner conductor 51c and the outer conductor 51e. The matching circuit 63 includes inductors L1 and L2 and capacitors C5 and C6 so as to match the capacitance C3 and C4. One end of the inductor L1 is connected to the inner conductor 51c of the coaxial cable 3c. The other end of the inductor L1 is connected to one end of the capacitor C6. One end of the inductor L2 is connected to the other end of the inductor L1, while the other end of the inductor L2 is grounded by being in contact with the enclosure 3a. One end of the capacitor C5 is connected to the other end of the inductor L1 and the other end of the capacitor C5 is grounded. The other end of the capacitor C6 is connected to the base 51b of the linear antenna 51. The inductor L1 is configured to offset the capacitances C3 and C4 and the capacitor C6 acts to lower impedance.

As described above, according to the second embodiment, by using the coaxial cable 3c as a part of the linear antenna 51, an area of the linear antenna 51 generating the magnetic field can be limited to an area in which the outer conductor 51e of the coaxial cable 3c is removed and the occurrence of an unnecessary magnetic field from the linear antenna 51 to electronic parts of the article 5 can be reduced. The length of the coaxial cable 3c from which the outer conductor 51e is removed is more than the length of the inner conductor 51c lying within the case 5a.

Third Exemplary Embodiment

Figure 15:
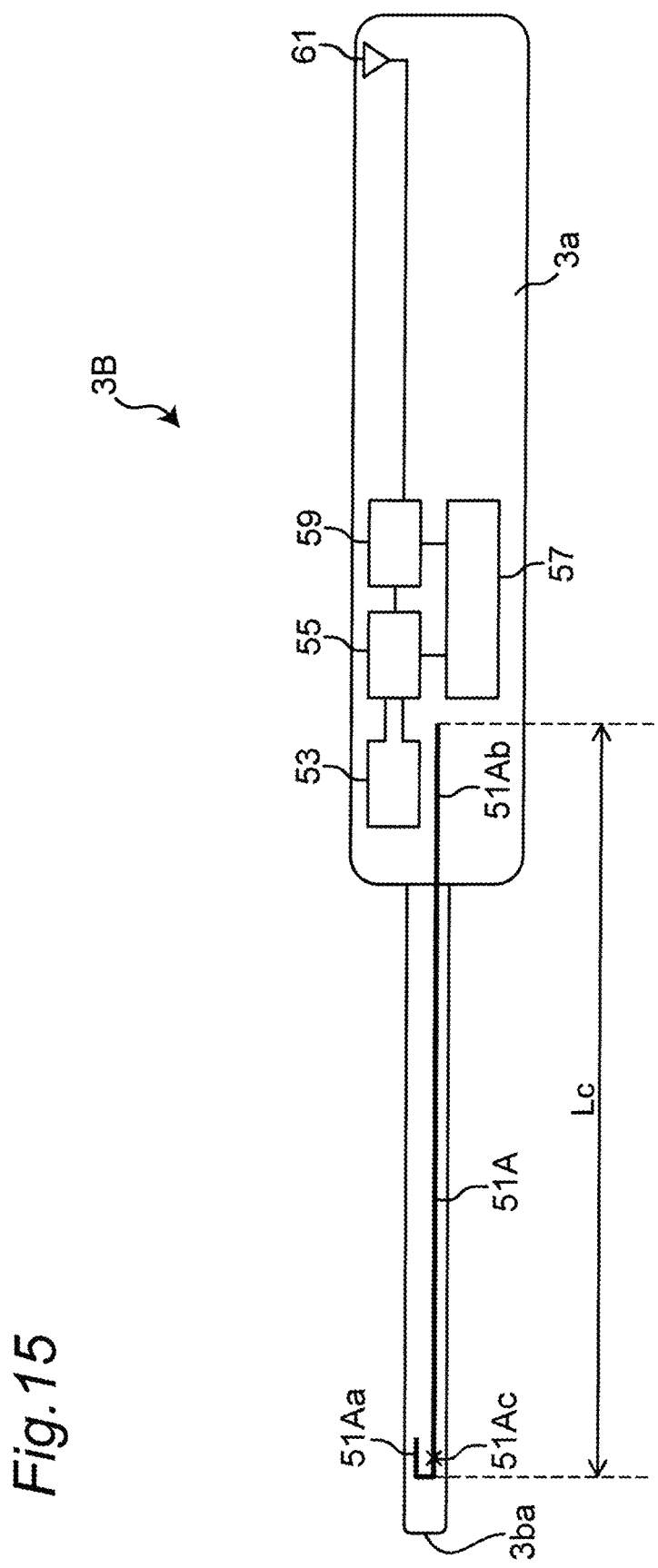
FIG. 15 is a diagram illustrating a configuration of a reader device of a third exemplary embodiment.

Referring next to FIG. 15, a reader device 3B of a third exemplary embodiment of the present invention will be described. FIG. 15 is a diagram illustrating a configuration of the reader device of the third embodiment. The reader device 3B of the third embodiment has a bent tip 51Aa of a linear antenna 51A. Except items described below, the configuration of the reader device 3B of the third embodiment is common to the reader device 3 of the first embodiment.

In the reader device 3B of the third embodiment, the full length of the linear antenna 51a is longer than a half wavelength of the wavelength λ of communication frequencies. In this case, a node having excited high-frequency current value of 0 occurs in the linear antenna 51A. FIG. 15 shows a node 51Ac on the linear antenna 51A. Since no magnetic field occurs at this node 51Ac, the tip 51Aa of the linear antenna 51A is bent back in a U-shape at a portion beyond the length of the half wavelength (λ/2) of the wavelength λ of communication frequencies from the base 51Ab side. The length from an end on the base 51Ab side of the linear antenna 51A to the bent-back portion is Lc. Since the length Lc is longer than the half wavelength (λ/2) of the wavelength λ of communication frequencies, the node 51Ac is on the linear antenna 51A which is not bent back. The linear antenna 51A is disposed such that the position where the node 51Ac occurs overlaps with the bent-back portion. Thus, the magnetic field does not occur at the portion of the node 51Ac of the linear antenna 51A, but the magnetic field occurs at the bent-back portion of the linear antenna 51A overlapping the node 51Ac, so that the RFID tag 21 can be magnetic field coupled therewith.

From the above, even when the full length of the linear antenna 51A is longer than the half wavelength of the wavelength λ of communication frequencies, the RFID tag 21 can be magnetic field coupled even in the vicinity of the node 51Ac of the linear antenna 51A by bending back the portion beyond the half wavelength of the wavelength λ of communication frequencies in the linear antenna 51A.

Fourth Exemplary Embodiment

Figure 16:
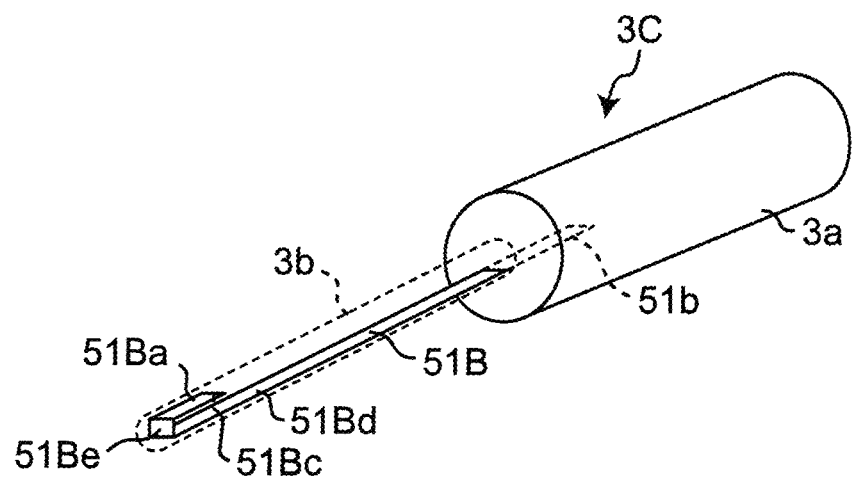
FIG. 16 is a diagram illustrating a configuration of a reader device of a fourth exemplary embodiment.
Figure 17:
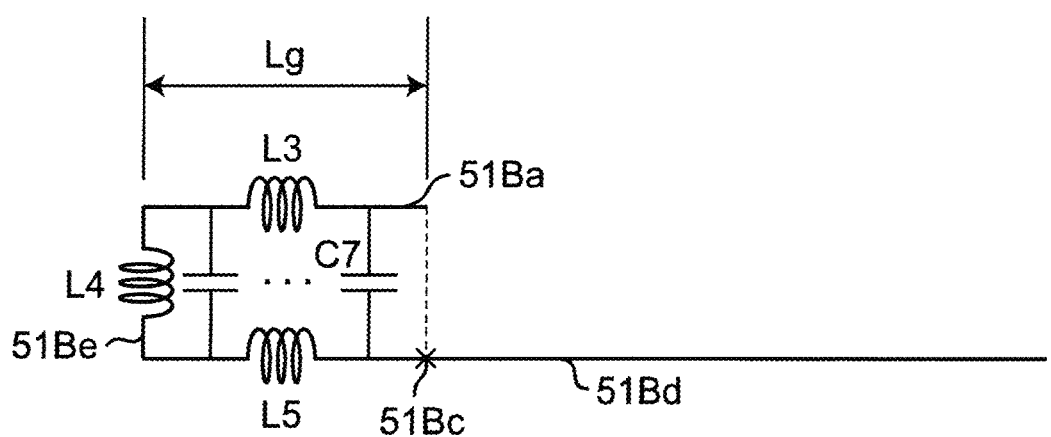
FIG. 17 is a diagram schematically illustrating a wiring configuration of an RFID tag of the fourth exemplary embodiment.

Referring next to FIG. 16 and FIG. 17, a reader device 3C of a fourth embodiment of the present invention will be described. FIG. 16 is a diagram illustrating a configuration of the reader device 3C of the fourth embodiment. In FIG. 17, the reader device 3C has a flat-shaped linear antenna 51B, with a tip 51Ba of the linear antenna 51B housed within the stick-shaped rod 3b being bent. Except items described below, the reader device 3C has a configuration common to the reader device 3B of the third embodiment.

The linear antenna 51B has a body 51Bd extending rectilinearly from the base 51b, a bent part 51Be that is bent in the direction intersecting the body 51Bd, and the tip 51Ba further bent from the bent part 51Be and facing the body 51Bd.

The linear antenna 51B has an inductor L3 as a coil component of the tip 51Ba, an inductor L4 as a coil component of the bent part 51Be, and an inductor L5 as a coil component of an area of the body 51Bd facing the tip 51Ba. The linear antenna 51B has a capacitance C7 occurring between the tip 51Ba and the area of the body 51Bd facing the tip 51Ba. The inductors L3 to L5 and the capacitance C7 make up an LC parallel resonance circuit. Thereby, a portion of the body 51Bd facing a tip of the tip 51Ba results in a node 51Bc. In this manner, the position of the node 51Bc can be determined irrespective of the length of the linear antenna 51B, so that designing of the linear antenna 51B becomes easy. A capacitor may be connected as the capacitance C7 between the tip 51Ba and the area of the body 51Bd facing the tip 51Ba.

In an exemplary aspect, a length Lg of the tip 51Ba is equal to or less than a quarter wavelength of communication frequencies. The width of the linear antenna 51B is e.g. 1 mm and the bend height of the bent 51Be is 1 mm. Thus, by insertion of the linear antenna 51B having the LC resonance circuit into the interior of the article 5, the magnetic field radiation performance can be further improved.

Fifth Exemplary Embodiment

Figure 18:
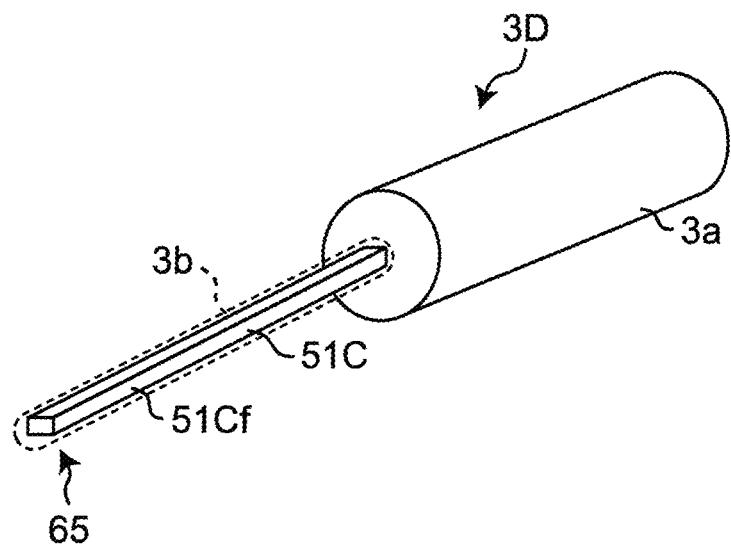
FIG. 18 is a diagram illustrating a configuration of a reader device of a fifth exemplary embodiment.
Figure 19:
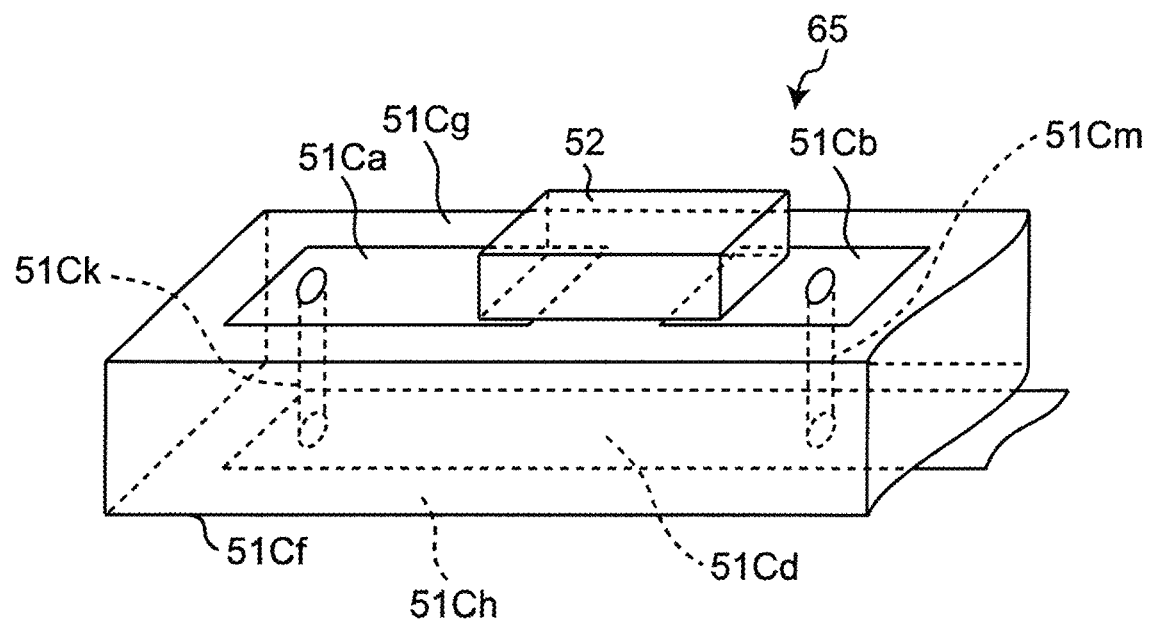
FIG. 19 is a diagram illustrating a configuration of a linear antenna's tip of the fifth exemplary embodiment.

Referring next to FIG. 18 and FIG. 19, a reader device 3D of a fifth exemplary embodiment of the present invention will be described. FIG. 18 is a diagram illustrating a configuration of the reader device 3D of the fifth embodiment. FIG. 19 is a diagram illustrating a configuration of a tip of a linear antenna 51C of the fifth embodiment. It is noted that except for the items described below, the reader device 3D of the fifth embodiment is common to the reader device 3C of the fourth embodiment.

In the reader 3D of the fifth embodiment, the linear antenna 51C housed within the stick-shaped rod 3b has an elongated flat-shaped board 51Cf. The board 51Cf is an insulating printed board, for example, it is an FR4. The board 51Cf extends rectilinearly from the interior of the enclosure 3a of the reader device 3D to the exterior. The tip of the board 51Cf has an LC parallel resonance circuit 65 configured thereon.

A first conductor pattern 51Ca and a second conductor pattern 51Cb are formed on a first principal surface 51Cg of the board 51Cf. The first conductor pattern 51Ca and the second conductor pattern 51Cb are separately arranged. A third conductor pattern 51Cd is formed on a second principal surface 51Ch facing the first principal surface 51Cg of the board 51Cf. The first conductor pattern 51Ca, the second conductor pattern 51Cb, and the third conductor pattern 51Cd each have a rectangular shape and are e.g. a conductor pattern formed by copper plating.

The first conductor pattern 51Ca and the third conductor pattern 51Cd are connected by a via hole 51Ck formed in the board 51Cf. The second conductor pattern 51Cb and the third conductor pattern 51Cd are connected by a via hole 51Cm. The first conductor pattern 51Ca and the second conductor pattern 51Cb are connected by a chip-type capacitor 52. Therefore, the LC parallel resonance circuit is configured from a capacity of the capacitor 52 and inductors as coil components of the first conductor pattern 51Ca, the second conductor pattern 51Cb, and the third conductor pattern 51Cd.

According to the reader device 3D of the RFID tag 21 of the fifth embodiment, the reader device 3D includes the linear antenna 51C configured to be inserted into a hole and the feed loop 53 electromagnetically coupled with the base on the other end side of the linear antenna 51C, the linear antenna 51C including the board 51Cf, the first conductor pattern 51Ca formed on the first principal surface 51Cg of the board 51Cf, the second conductor pattern 51Cb formed separated from the first conductor pattern 51Ca on the first principal surface 51Cg, the capacitor 52 connecting the first conductor pattern 51Cb and the second conductor pattern 51Cb, and the third conductor pattern 51Cd formed on the second principal surface 51Ch facing the first principal surface 51Cg, the third conductor pattern 51Cd connected to the first conductor pattern 51Ca and the second conductor pattern 51Cb via the via holes 51Ck and 51Cm formed in the board 51Cf, the feed loop 53 electromagnetically coupled with the base on the other end side of the third conductor pattern 51Cd. Accordingly, since the tip of the linear antenna 51c includes the LC resonance circuit, the magnetic field radiation performance can be further improved by inserting the linear antenna 51B with the LC resonance circuit into the article 5 in this manner. Improved magnetic field radiation performance can be achieved.

In general, it is noted that the present invention is not limited to the above exemplary embodiments and can be modified and implemented as follows.

(1) In the exemplary embodiments described above, the article 5 having the RFID tag 21 attached thereto is the laptop computer, but is not limited thereto. In other examples, the article 5 may be a production machine, a motor, a watch, a telephone or the like. The case 5a forms at least a part of the external surface of an electronic apparatus or the production machine and includes, for example, a steel plate making up the external surface of the production machine.

It is noted that the hole 5b need not be a hole that is constantly open and may be a hole, such as a bolt hole, that opens when a part such as a bolt is removed. In this case, tag information of the RFID tag 21 disposed close to the bolt hole can be read by inserting the rod 3b of the reader device 3 into the bolt hole opened by removing its bolt.

(2) In the above exemplary embodiments, the rod tip 3ba of the reader device 3 has a stick or a needle shape, but is not limited thereto. In addition, the rod tip 3ba may have a curved or a spherical shape. If the rod tip 3ba has the curved or the spherical shape, damage to other parts within the article 5 can be prevented even when the rod tip comes into contact with the other parts. In a case that the rod tip 3ba has a bent or a curved shape, the linear antenna 51 may also have or may not have the bent or the curved shape. In a case that the rod tip 3ba is of the spherical shape, the tip 51a of the linear antenna 51 need not be of the curved shape.

(3) In the above exemplary embodiments, the feed loop 53 and the linear antenna 51 are spaced apart and are coupled with each other by the magnetic field coupling, but this is not limitative. The feed loop 53 and the linear antenna 51 may be brought into contact with each other for electrical coupling therebetween. In this case, directions of current flowing through the feed loop 53 and the linear antenna 51 are the same. Also in a case that the linear antenna 51 and the feed loop 53 are directly coupled in this manner, a node having 0 current value occurs on the linear antenna 51 when the length La of the linear antenna 51 exceeds the half wavelength.

(4) In the above exemplary embodiments, the hole 5b is opened for specific usage of the other parts included in the article 5, but this is not limitative. Even if the hole 5b is opened for reading the RFID tag 21, it may have a dimension enough to allow the rod 3b of the reader device 3 to be inserted, so that damage to the design-ability of the article 5 can be restrained.

(5) In the above exemplary embodiments, the loop antenna 27 of the RFID tag 21 has the metal pin 39 disposed passing through the resin block 35 from top to bottom and the top-surface-side conductor pattern (i.e., a first conductor pattern) 40 formed on the top surface of the resin block 35, which are configured from respectively different members, but this is not limitative. The metal pin 39 and the top-surface-side conductor pattern 40 may be integrated into a gate type member.

The RFID tag reader device, the article, the system, and the RFID tag reading method according to the present invention can conceal the position of the RFID tag and are useful for preventing illegal activities on RFID tag information.

EXPLANATIONS OF LETTERS OR NUMERALS

1 RFID tag reading system
3, 3A, 3B reader device
3a enclosure
3b rod
3ba rod tip
3c coaxial cable
5 article
5a case
5b hole
5c depth direction
7 host computer
7a processor
7b antenna
7c display
7d input part
9 communication network
11 server
21 RFID tag
23 RFIC element
24 wiring pattern
27 loop antenna
27a first feed coil
27b second feed coil
27c loop axis
31, 32, 33 connecting conductor
34 printed wiring board
35 resin block
36 upper-surface-side conductor pattern
36a, 36b, 36c, 36d wiring pattern
37 lower-surface-side conductor pattern
37a, 37b wiring pattern
38 via hole conductor
39 metal pin
40 top-surface-side conductor pattern
40a wiring pattern
41 protective layer
43 support part
51, 51A, 51B, 51C linear antenna
51a, 51Aa, 51Ba tip
51b, 51Ab base
51c inner conductor
51d insulator
51e outer conductor
51Ac, 51Bc node
51Bd body part
51Be bent part
51Ca first conductor pattern
51Cb second conductor pattern
51Cd third conductor pattern
51Cf board
51Cg first principal surface
51Ch second principal surface
51Ck via hole
51Cm via hole
52 capacitor
53 feed loop
53a loop axis
55 reader IC
57 power supply part (battery)
59 wireless LAN IC
61 wireless LAN antenna
62 insulating protector
63 matching circuit

What is claimed:

1. A system for reading an RFID tag, the system comprising:
   an article comprising the RFID tag housed in the article and a case with a hole passing through from an exterior to an interior of the case; and
   a reader device including a linear antenna configured to be inserted into the hole and having a tip as an open end thereof,
   wherein the RFID tag is housed within the case of the article and includes a loop antenna, and
   wherein the RFID tag is disposed at a position housed in the case such that a passing-through direction of the hole intersects a direction of a loop axis of the loop antenna when the linear antenna of the reader device is inserted into the hole of the case of the article.

2. The system for reading an RFID tag of claim 1, wherein the RFID tag is disposed within the case at a position to enable magnetic coupling with the linear antenna when the linear antenna is inserted into the hole.

3. The system for reading an RFID tag of claim 2, wherein the reader device comprises a feed loop electromagnetically coupled with the linear antenna at a base on an end opposite to the tip of the linear antenna.

4. The system for reading an RFID tag of claim 3, wherein the reader device is configured to read tag information via the linear antenna and the feed loop.

5. The system for reading an RFID tag of claim 1, wherein the reader device is configured as a handy type reader device.

6. The system for reading an RFID tag of claim 1, wherein the RFID tag is configured to store tag information that includes ID information related to at least one of manufacturing information and authenticity information of the article.

7. A reader device of an RFID tag, comprising:
a linear antenna including a tip as an open end on a first end and that is configured to be inserted into a hole of an article case; and
a feed loop electromagnetically coupled with a base on a second end of the linear antenna opposite the first end.

8. The reader device of claim 7, wherein the feed loop comprises a loop axis direction that intersects with a base of the linear antenna.

9. The reader device of claim 7, wherein the linear antenna comprises a length that is shorter than a half wavelength of a communication frequency with of RFID tag.

10. The reader device of claim 7, wherein the linear antenna comprises a length that is larger than a half wavelength of a communication frequency of the RFID tag, and the tip of the linear antenna is bent back.

11. The reader device of claim 7,
wherein the reader device comprises a coaxial cable,
wherein the coaxial cable comprises an inner conductor, an insulator surrounding the inner conductor, and an outer conductor surrounding the insulator,
wherein a part of the linear antenna is the inner conductor of the coaxial cable,
wherein the insulator is exposed surrounding the inner conductor on the tip of the linear antenna, and
wherein the reader device has a matching circuit between the inner conductor and the base of the linear antenna.

12. The reader device of claim 7, wherein the feed loop and the linear antenna are positioned apart from each other and are magnetic field coupled with each other.

13. The reader device of claim 7, wherein the feed loop and the linear antenna are in contact with each other and are electrically coupled with each other.

14. The reader device of claim 7, wherein the reader device is configured as a handy type reader device.

15. An article, comprising:
a case with a hole passing through from an exterior to an interior of the case; and
an RFID tag housed within the case and having a loop antenna,
wherein the RFID tag is disposed such that a passing-through direction of the hole intersects a direction of a loop axis of the loop antenna.

16. The article of claim 15, wherein the RFID tag is disposed within a distance shorter than a half wavelength of a communication frequency of the RFID tag from the hole in the passing-through direction of the hole.

17. The article of claim 15, wherein the RFID tag is disposed in a projected area on which an open area of the hole is projected in the passing-through direction.

18. The article of claim 15, wherein the case comprises a metal.

19. The article of claim 15, wherein the hole is opened for ventilating an interior of the case or connecting to other parts within the case.

20. The article of claim 15, wherein tag information stored in the RFID tag includes ID information related to at least one of manufacturing information and authenticity information of the article.

* * * * *